United States Patent
Kimura et al.

(10) Patent No.: US 10,131,087 B2
(45) Date of Patent: Nov. 20, 2018

(54) METHOD OF MOLDING A THERMOPLASTIC RESIN ARTICLE AND APPARATUS FOR MOLDING SAME

(71) Applicant: Toyo Seikan Group Holdings, Ltd., Tokyo (JP)

(72) Inventors: Satoo Kimura, Kanagawa (JP); Masaki Aoya, Kanagawa (JP); Tsutomu Iwasaki, Kanagawa (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 933 days.

(21) Appl. No.: 14/483,768

(22) Filed: Sep. 11, 2014

(65) Prior Publication Data
US 2015/0021798 A1    Jan. 22, 2015

Related U.S. Application Data

(63) Continuation of application No. PCT/JP2013/001948, filed on Mar. 22, 2013.

(30) Foreign Application Priority Data

| Mar. 22, 2012 | (JP) | 2012-066348 |
| May 10, 2012 | (JP) | 2012-108723 |
| Dec. 5, 2012 | (JP) | 2012-266365 |

(51) Int. Cl.
*B29C 59/16* (2006.01)
*B29C 59/02* (2006.01)
(Continued)

(52) U.S. Cl.
CPC .......... *B29C 59/16* (2013.01); *B29C 35/0805* (2013.01); *B29C 35/16* (2013.01);
(Continued)

(58) Field of Classification Search
CPC ....... B29C 59/16; B29C 35/16; B29C 59/022; B29C 35/0805; B29C 59/02;
(Continued)

(56) References Cited

U.S. PATENT DOCUMENTS

| 5,764,845 A | 6/1998 | Nagatani et al. |
| 5,799,126 A | 8/1998 | Nagatani et al. |
(Continued)

FOREIGN PATENT DOCUMENTS

| CN | 1266394 A | 9/2000 |
| DE | 1021741 B | 12/1957 |
(Continued)

OTHER PUBLICATIONS

Office Action dated May 24, 2016, in corresponding Japanese Patent Application No. 2012-108723 (with translation) (8 pages).
(Continued)

*Primary Examiner* — Nahida Sultana
(74) *Attorney, Agent, or Firm* — Osha Liang LLP

(57) ABSTRACT

Aimed at providing a method for molding a thermoplastic resin product and a molding apparatus therefor that enable productivity, transfer quality or the like to be improved. Provided is a method for molding a thermoplastic resin product that includes a heating step, a transfer step, a cooling step and a mold-releasing step, and wherein, in the heating step, a stamper is irradiated with infrared rays in a state where a cooling member is not irradiated with infrared rays, and at least in the final stage of the transfer step, the stamper and the cooling member are brought into contact.

8 Claims, 23 Drawing Sheets

(51) Int. Cl.
  *B29C 35/08*  (2006.01)
  *B29C 35/16*  (2006.01)
  *B29C 43/52*  (2006.01)
  *B29D 11/00*  (2006.01)
  *B29K 101/12* (2006.01)
  *B29L 11/00*  (2006.01)

(52) U.S. Cl.
  CPC ............ *B29C 59/02* (2013.01); *B29C 59/022* (2013.01); *B29C 2035/0822* (2013.01); *B29C 2035/1616* (2013.01); *B29C 2043/522* (2013.01); *B29C 2059/023* (2013.01); *B29D 11/00269* (2013.01); *B29K 2101/12* (2013.01); *B29L 2011/005* (2013.01)

(58) Field of Classification Search
  CPC ....... B29C 2059/023; B29C 2035/0822; B29L 2011/005; B29K 2101/12; B29D 11/00269
  USPC .... 264/1.27, 492, 496, 293; 425/174.4, 384, 425/385
  See application file for complete search history.

(56) References Cited

U.S. PATENT DOCUMENTS

| | | | |
|---|---|---|---|
| 6,416,311 | B1 | 7/2002 | Springer et al. |
| 8,092,737 | B2* | 1/2012 | Chang ................. B29C 35/0805 264/293 |
| 8,215,944 | B2 | 7/2012 | Takaya et al. |
| 2009/0194913 | A1* | 8/2009 | Chang ................. B29C 35/0805 264/447 |
| 2009/0194914 | A1* | 8/2009 | Uozu ...................... B29C 33/38 264/496 |
| 2012/0223461 | A1 | 9/2012 | Takaya et al. |
| 2014/0117587 | A1 | 5/2014 | Aoya et al. |
| 2017/0320270 | A1* | 11/2017 | Mandel ................. B29C 64/268 |
| 2017/0334137 | A1* | 11/2017 | Nystrom ............... B29C 64/393 |

FOREIGN PATENT DOCUMENTS

| | | |
|---|---|---|
| EP | 2239127 A1 | 10/2010 |
| JP | S53-055355 | 5/1978 |
| JP | H05-061022 | 10/1993 |
| JP | H07-098416 A | 4/1995 |
| JP | 2001-097384 A | 4/2001 |
| JP | 2001158044 A | 6/2001 |
| JP | 2001/313152 A | 11/2001 |
| JP | 2002/289548 A | 10/2002 |
| JP | 2005074700 A | 3/2005 |
| JP | 2006088517 A | 4/2006 |
| JP | 2006137019 A | 6/2006 |
| JP | 2006255900 A | 9/2006 |
| JP | 2006-315313 A | 11/2006 |
| JP | 2008188953 A | 8/2008 |
| JP | 2008254230 A | 10/2008 |
| JP | 2011061214 A | 3/2011 |
| JP | 2012091456 A | 5/2012 |
| JP | 201320738 A | 1/2013 |
| TW | 200936350 A | 9/2009 |

OTHER PUBLICATIONS

International Search Report for corresponding International Application No. PCT/JP2013/001948, dated Jun. 25, 2013 (2 pages).
Written Opinion for corresponding International Application No. PCT/JP2013/001948, dated Jun. 25, 2013 (4 pages).
International Preliminary Report on Patentability for corresponding PCT/JP2013/001948, dated Oct. 2, 2014 (6 pages).
Explanation of Situation for Accelerated Examination of Japanese Patent Application No. 2012-66348 (3 pages).
Office Action dated Nov. 3, 2015, by the State Intellectual Property Office of the People's Republic of China in corresponding Chinese Patent Application No. CN-201380015664.9 (9 pages).
Office Action issued in corresponding Japanese Application No. 2011-151395 dated Sep. 1, 2015 (3 pages).
Office Action dated Mar. 29, 2016, in corresponding Japanese Patent Application No. 2011-151395 (4 pages).

* cited by examiner

Part D

METHOD OF MOLDING A THERMOPLASTIC RESIN ARTICLE AND APPARATUS FOR MOLDING SAME

CROSS-REFERENCE TO RELATED APPLICATIONS

This application claims the benefit of International Patent Application No. PCT/JP2013/001948, filed on Mar. 22, 2013, which is incorporated by reference in its entirety.

TECHNICAL FIELD

The present invention relates to a method for molding a thermoplastic resin product and a molding apparatus therefor. In particular, the present invention relates to a method for molding a thermoplastic resin product and a molding apparatus therefor which enable productivity and transfer quality to be improved.

BACKGROUND ART

In a microchemical chip, a microfluid device, a light-guiding panel, a Fresnel lens, an optical disc, an optical device or the like, establishment of a technology of transferring a fine pattern (structure) to a plastic molded product with a high degree of accuracy or a technology of improving the productivity of the transfer or the like is desired. Under such circumstances, various technologies have been proposed.

For example, Patent Document 1 discloses a technology of a method for molding and processing plastics, in which a base having a transfer surface and is formed of a plastic material is prepared, the base is secured in the state where the transfer surface is exposed, the shape-forming surface of a stamper which is at least partially formed of an infrared rays-transmitting material is held in close contact with the transfer surface of the base, and the stamper is irradiated with infrared rays in a direction in which the base is directed.

Patent Document 2 discloses a technology of a hot press molding method in which a desired pattern is transferred to the surface of a thermoplastic resin plate by hot press molding.

This technology is characterized in that, between a cooling plate to be mounted in a pressing machine and the thermoplastic resin plate, a heating plate provided with a stamper having a pattern on the side facing the thermoplastic resin plate is arranged; before pressing operation, the stamper and the heating plate are heated at a first predetermined temperature exceeding the softening temperature of the thermoplastic resin plate by high-frequency induction heating; then, the stamper is pushed to the surface of the thermoplastic resin plate by pressing operation to allow the pattern to be transferred to the surface of the thermoplastic resin plate; and with the stamper being pushed to the thermoplastic resin plate, the heating plate and the stamper are cooled by the cooling plate to a second predetermined temperature which is lower than the softening temperature.

RELATED ART DOCUMENTS

Patent Documents

Patent Document 1: JP-A-2001-158044
Patent Document 2: JP-A-2006-255900

SUMMARY OF THE INVENTION

Problems to be Solved by the Invention

However, the method for molding and processing plastics disclosed in Patent Document 1 mentioned above includes a method in which infrared rays transmit an infrared rays-transmitting material, and the temperature of the infrared rays-transmitting material is elevated by transmission of infrared rays. Although an increase in temperature of the infrared rays-transmitting material is smaller as compared with an increase in temperature of a material that does not transmit infrared rays, there is a problem that, when an infrared rays-transmitting material is used as a cooling member and/or a reinforcing material for a thin (normally having a thickness of 0. several mm) stamper, cooling takes a long time, and as a result, productivity cannot be improved.

In addition, when a thin stamper is used, the stamper may not be able to keep a flat state and may be deformed by curvature, deflection or the like. In such a case, it has been demanded to suppress deformation of a stamper, conduct transfer while keeping the stamper in the flat state, thereby to improve the transfer quality.

As for the method for molding and processing plastics disclosed in Patent Document 1, it has been demanded that the temperature of a stamper is elevated uniformly. Specifically, the method disclosed in Patent Document 1 has the following problem. That is, if the temperature distribution of the stamper is poor when elevating the temperature, a long heating time is required in order to allow the temperature of the entire molding surface to be increased to a temperature at which molding is possible. By heating for a long period of time, cooling takes a long period of time. As a result, molding cycle is prolonged and productivity cannot be improved.

In the above-mentioned hot press molding method disclosed in Patent Document 2, the stamper and the heating plate are heated by high-frequency induction heating. However, the temperature distribution of the stamper is poor by the high-frequency induction heating, and in order to conduct uniform heating, a long heating time is required. Further, since heating during molding (pressing) cannot be conducted, it is required to heat the heating plate, and as a result, the heating time and the cooling time are prolonged, whereby improvement in productivity cannot be attained.

The present invention has been made in view of the above-mentioned problems, and an object of the present invention is to provide a method for molding a thermoplastic resin product and a molding apparatus therefor which enable productivity, transfer quality and the like to be improved.

Means for Solving the Problems

In order to achieve the above-mentioned object, the method for molding a thermoplastic resin product of the present invention is a method for molding a thermoplastic resin product comprising:

a heating step in which a stamper is irradiated with infrared rays emitted from a heating apparatus through an irradiation path, whereby the stamper is radiatingly heated;

a transfer step in which the structure of the shape-forming surface of the stamper that has been radiatingly heated is transferred to the transfer surface of a thermoplastic resin;

a cooling step in which the stamper is brought into contact with a cooling member, and the thermoplastic resin is cooled via the stamper, thereby to solidify or harden the thermoplastic resin; and a mold-releasing step in which the state where the shape-forming surface and the transfer surface are in contact is released, thereby to allow a molded product to be released from the mold, wherein in the heating step, the stamper is irradiated with the infrared rays in the state where the cooling member is retreated from the irradiation path; and at least in the final stage of the transfer step, the stamper is brought into contact with the cooling member.

The apparatus for molding a thermoplastic resin product of the present invention is an apparatus for molding comprising:

a heating apparatus for conducting infrared radiation heating by using a light source;

a stamper that is radiatingly heated by infrared rays emitted from the light source;

a cooling member that is brought into contact with the stamper that has been radiatingly heated to cool the stamper;

a first mold having an advancing/retreating means that allows the cooling member to advance to or retreat from the irradiation path of infrared rays;

a second mold that holds a thermoplastic resin to which the structure of the shape-forming surface of the stamper is transferred; and a stamp-holding means for holding the stamper in a relatively movable manner in order to allow the stamper and the cooling member to contact with or separate from each other;

wherein in the state where the cooling member is retreated from the irradiation path of infrared rays, the stamper is irradiated with infrared rays emitted from the heating apparatus, thereby to radiatingly heat the stamper; and at least in the final stage of the transfer, the stamper is brought into contact with the cooling member that has entered the irradiation path of infrared rays, whereby the cooling member reinforces the stamper.

According to the method for molding a thermostatic resin product and the apparatus therefor of the present invention, infrared rays irradiated from the heating apparatus directly irradiates the stamper without irradiating the cooling member, thereby to radiatingly heat the stamper. Therefore, a cooling member that is cooler since it is not heated by infrared rays can be used. As a result, the cooling time can be shortened, whereby productivity can be significantly improved.

Further, in the case where a thin stamper is used and the stamper that is originally flat is deformed by curvature, deflection or the like, it is possible to suppress deformation of a stamper, and conduct transfer while keeping the flat state of a stamper, whereby transfer quality can be improved.

MODE FOR CARRYING OUT THE INVENTION

[First Embodiment of the Method for Molding a Thermoplastic Resin Product and the Apparatus for Molding a Thermoplastic Resin Product]

Figure 1A:
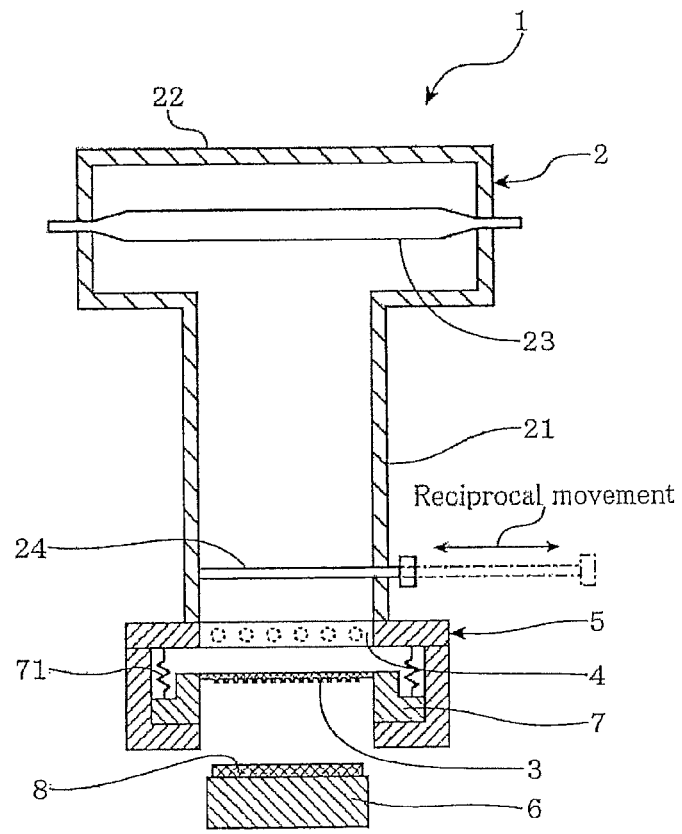
FIG. 1A is a schematic cross-sectional view for explaining the molding apparatus according to the first embodiment of the present invention.
Figure 1B:
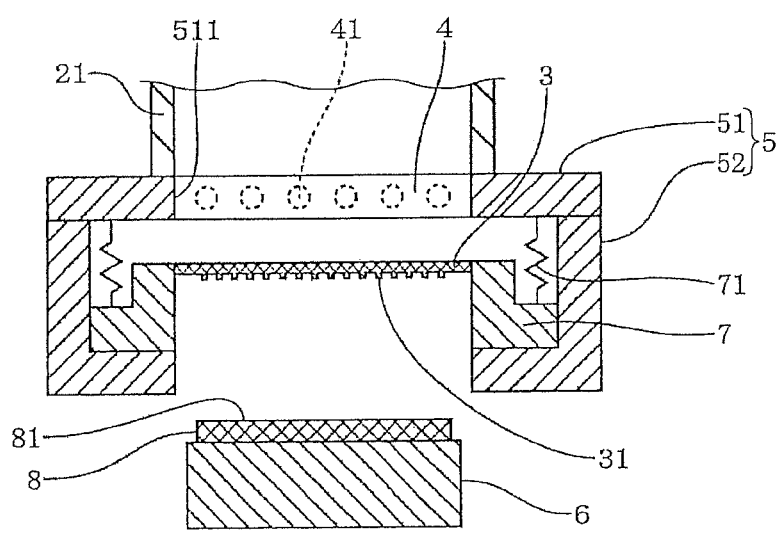
FIG. 1B is an enlarged cross-sectional view of essential parts for explaining the molding apparatus according to the first embodiment of the present invention.

FIG. 1 is a schematic view for explaining the molding apparatus according to the first embodiment of the present invention; in which FIG. 1A is a cross-sectional view, and FIG. 1B is an enlarged cross-sectional view of essential parts.

In FIG. 1, a molding apparatus 1 for a thermoplastic resin product according to this embodiment (hereinafter appropriately abbreviated as the molding apparatus 1) is provided with a heating apparatus 2, a stamper 3, a cooling member 4, a first mold 5, a second mold 6, a stamper-holding means 7 or the like.

In this embodiment, the thermoplastic resin is a base 8 that has been molded in advance. The structure of a shape-forming surface 31 of the stamper 3 is transferred to a transfer surface 81 of the base 8.

Here, the base that has been molded in advance means a base that has finished an injection molding step or a compression molding step (i.e. a base having a normal temperature after passage of each step) such as a circular disc for CDs, a rectangular sheet for color filters or a sheet that has been wound in a roll.

The thermoplastic resin in this embodiment is not restricted to the above-mentioned base 8 that has been molded in advance. For example, it may be a base (not shown) that has been heated in an injection molding step or a compression molding step.

Here, the base that has been heated in an injection molding step or a compression molding step means a base that has not passed completely an injection molding step or a compression molding step (for example, a base that has been molten or softened in the middle of the step or a base that has passed each step but has not cooled to normal temperature (still heated)).

(Heating Apparatus)

Figure 2A:
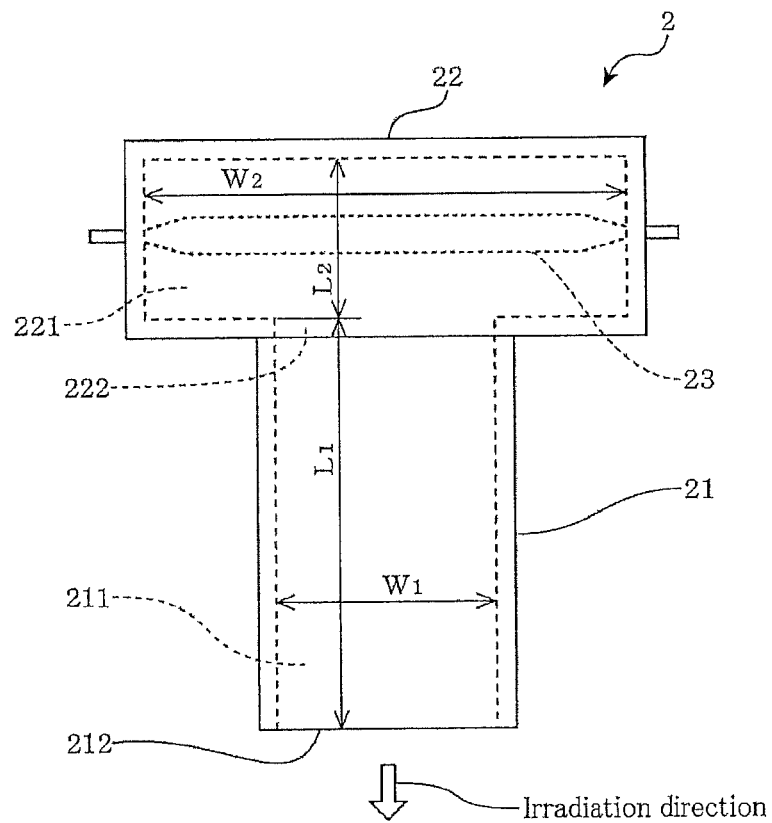
FIG. 2A is a schematic front view for explaining the heating apparatus according to the first example of the present invention.
Figure 2B:
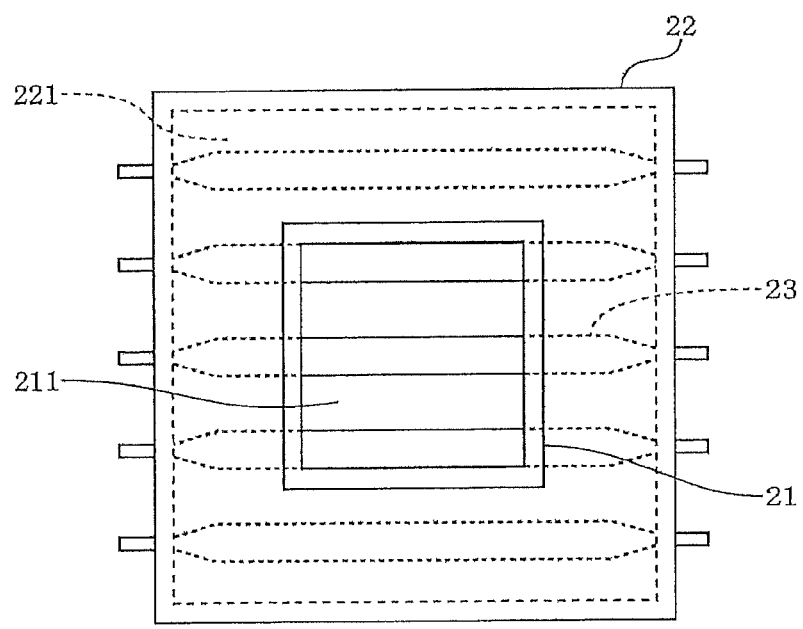
FIG. 2B is a bottom view for explaining the heating apparatus according to the first example of the present invention.

FIG. 2 is a schematic view for explaining the heating apparatus in the molding apparatus according to the first example of the present invention; in which FIG. 2A is a front view, and FIG. 2B is a bottom view. In FIG. 2, a shutter 24 is omitted.

In FIG. 2, the heating apparatus 2 according to the first example is provided with a light pipe 21 having a square cross section, a light box 22 which is connected to the light pipe 21 and has a square cross section, a light source 23 which is accommodated within the light box 22, the shutter 24 (see FIG. 1A) or the like.

This heating apparatus 2 conducts infrared rays-radiation heating for the stamper 3 by means of the light source 23.

The light source 23 is a source of infrared rays such as a halogen lamp, and can effectively conduct radiation heating. In this embodiment, as the light source 23, five rod-like halogen lamps are arranged inside the light box 22 at almost equal intervals.

The light source 23 is not limited to the halogen lamp, and the shape, number, installation direction, output power or the like of the light source 23 are not particularly restricted.

The light box 22 has a box-like shape having a square cross section, and is formed of a plate-like member having a mirror surface on its inside (for example, a steel plate in which silver plating or the like is provided on the surface serving as the inner surface). The cross-sectional shape is a shape of a cross section which crosses orthogonally with the irradiation direction.

This light box 22 has an internal space 221 has almost a rectangular parallelopipe shape. The internal space 221 has a square bottom surface (the length of one side is $W_2$), and has a height of $L_2$. In the light box 22, in the middle of the one side (the lower side in FIG. 2A), an opening part 222 is provided, and the opening part 222 has a square shape (the length of one side is $W_1$).

The light box 22 is connected to the light pipe 21 through the opening part 222 such that it is intercommunicated with the light pipe 21.

Here, the light box 22 has a box-like shape having a square cross section. Therefore, infrared rays radiated from the light source 23 pass through the opening part 222 and enter the light pipe 21 with its part being not reflected by the mirror surface.

Other infrared rays pass the opening part 222 after once or twice or more of reflection by the mirror surface, and then enter the light pipe 21. The infrared rays are reflected by the mirror surface which is a rectangular parallelopipe (mirror surface corresponding to the internal space 221), pass through the opening part 222 in the uniformed state (called "premixed state"), and enter the light pipe 21. As a result, the heating apparatus 2 enables the opening part 222 to be irradiated with the infrared rays in the uniformed state (called "premixed state").

The light pipe 21 is a cylindrical shape having a square cross section (a cylindrical shape with the both ends being open), and is formed of a plate-like member having a mirror surface on its inside (for example, a steel plate in which silver plating or the like is provided on the surface serving as the inner surface). The light pipe 21 is normally a hollow mirror body. The shape of the light pipe is, however, not limited thereto. For example, the light pipe 21 may be a solid transparent body.

This light pipe 21 has an appropriately rectangular parallelopiped inner space 211. The inner space 211 has a square bottom surface (the length of one side is $W_1$) and has a height of $L_1$. The light pipe 21 is connected with the light box 22 such that one end part (an upper end part in FIG. 2A) corresponds to the opening part 222.

The relationship $W_2$ and $W_1$ is $W_2 > W_1$ in this embodiment. The above-mentioned relationship $W_1$ and $L_1$ may appropriately be set, while satisfying this requirement.

The structures of the light pipe 21 and the light box 22 are not limited to those mentioned above. That is, although not shown, it is preferred that the heating apparatus 2 be provided with a light pipe having a polygonal cross section, a light box being connected with this light box and having a polygonal cross section, a light source to be accommodated within this light box. The cross sectional shape of the light pipe may be a triangle, a square, a regular hexagon or a parallelohexagon. Further, the cross sectional shape of the light box may be a triangle, a square, a regular hexagon or a hexagon with three pair of parallel lines.

Due to such a configuration, almost as in the case of a heating apparatus which was disclosed by the inventors of the present invention in Japanese Patent Application No. 2011-151395 (JP-A-2013-020738), the heating apparatus 2 can realize a radiance distribution which has been uniformized at a significantly high level, and as a result, can heat the stamper 3 uniformly. As a result, it is possible to eliminate disadvantages that, due to poor temperature distribution of the stamper, a long heating time is required to elevate the temperature of the entire molding surface to a temperature at which molding is possible, and a long heating time requires a long cooling time, whereby molding cycle is prolonged, and as a result, productivity cannot be improved.

The shutter 24 is a plate-like member made of a material that blocks infrared rays, and is provided at the bottom of the light pipe 21 so as to be able to move reciprocally. It reciprocates by driving means such as an air cylinder (not shown). By this configuration, it is possible to control the irradiation time by the on-off operation of the shutter 24, thereby facilitating the temperature control of the stamper 3.

The heating apparatus 2 is not limited to the above-mentioned structure. The heating apparatus 2 may be one which has a structure different from that shown above. For example, the heating apparatus 2, although not shown, may be a heating apparatus that is able to conduct infrared ray radiation heating by using a light source, a carbon dioxide laser, a semiconductor laser, and a scanning-type laser obtained by combining these lasers with a scanner.

(Stamper)

The stamper 3 is a plate-like member normally formed of Ni or Si, and is radiatingly heated by infrared rays emitted from the light source 23. The stamper 3 of this embodiment has a thickness of normally several hundreds μm. However, as mentioned later, the thickness of the stamper 3 is not limited thereto. This stamper 3 has a shape-forming surface 31 at the bottom surface thereof, and a convex part and a concave part are formed on the shape-forming surface 31.

Although not shown, a black film may be formed on the upper surface of the stamper 3. Due to the formation of such a black film, infrared rays are absorbed effectively. As a result, the shape-forming surface 31 of the stamper 3 is heated uniformly and quickly by radiation heating of infrared rays. Further, instead of formation of the black film, a colored film and/or a plating film may be formed on the upper surface of the stamper 3. As examples of the colored film, silicone-based black paint, black Cr plating or the like can be given. As the plating film, electroless Ni plating or the like can be mentioned.

(Cooling Member)

Normally, the cooling member 4 is a plate-like member made of aluminum or copper having excellent thermal conductivity. As will be mentioned later, it contacts the stamper 3 that has been radiatingly heated, thereby to reinforce and cool the stamper 3. Here, the cooling member 4 is not irradiated with infrared rays and does not need to transmit infrared rays, and hence is formed of a material having excellent heat conductivity, whereby the cooling time of the base 8 can be shortened to improve productivity.

Further, in the cooling member 4, a cooling channel 41 for allowing a coolant such as cool water to be circulated is formed, and hence is cooled to a prescribed temperature. As a result, the cooling member can cool the stamper 3 effectively, whereby the cooling time can be shortened and productivity can be improved.

The cooling member 4 is provided in a base part 51 of the first mold 5 so as to be able to reciprocate, and by means of an advancing/retreating means such as an air cylinder (not shown), it reciprocates almost in the horizontal direction.

That is, in the molding apparatus 1, in a state where the cooling member 4 is retreated from the irradiation path of infrared rays (in this embodiment, an opening part 511 of the base part 51) (this state is often referred to as a state where the cooling member 4 is not irradiated with infrared rays), the stamper 3 is irradiated with infrared rays emitted from the heating apparatus 2, whereby the stamper 3 is radiatingly heated. Further, in the molding apparatus 1, at least in the final stage of the transfer, the stamper 3 is in contact with the cooling member 4 that has entered the irradiation path of infrared rays, whereby the cooling member 4 reinforces the stamper 3.

Here, the state where the cooling member 4 is retreated from the irradiation path of infrared rays or the state where the cooling member 4 is not irradiated with infrared rays includes a state where the cooling member 4 is not irradiated with infrared rays at all and a state where, although an end surface or the like of the cooling member 4 is irradiated with infrared rays, the upper surface (also called as the main surface) of the cooling member 4 is not almost irradiated with infrared rays.

The final stage of the transfer means a stage where the base 8 that has molten or softened has almost been deformed in accordance with the shape of the shape-forming surface 31.

By this configuration, when the stamper 3 is radiatingly heated by infrared rays emitted from the heating apparatus 2, since the cooling member 4 has already been retreated from the infrared rays irradiation path, the cooling member 4 is not at all or is not almost heated by infrared rays. For example, when the base 8 is cooled through an infrared rays-transmitting material, when irradiated infrared rays transmit the infrared rays-transmitting material, the infrared rays-transmitting material is heated irrespective of being infrared rays-transmitting material. In the molding apparatus 1, by using the cooling member 4 that is cooler since it is not heated by infrared rays, the cooling time can be shortened, whereby productivity can be improved.

Further, since the cooling member 4 functions as a reinforcing member of the stamper 3, the stamper 3 can be thin, whereby productivity can be improved.

In addition, since infrared rays do not transmit the cooling member 4, normally, by using the cooling member 4 made of a material having a higher thermal conductivity than an infrared rays-transmitting material such as aluminum and copper, the cooling time can be shortened, whereby productivity can be improved.

When the stamper 3 is connected with an infrared rays-transmitting material (normally this material is in the form of a flat plate), the heat of the stamper 3 is thermally conducted to the infrared rays-transmitting material. However, since the molding apparatus 1 does not use an infrared rays-transmitting material, the heating time and the cooling time required for cooling an infrared rays-transmitting material heated by thermal conductance can be shortened.

In addition, although not shown, a plurality of cooling members 4 can be used in sequence. In this case, the cooling member 4 that has been fully cooled can be used, and the cooling time can be shortened, whereby productivity can be improved.

Further, at least in the final stage of the transfer step, the stamper 3 is brought into contact with the cooling member 4, and the cooling member 4 reinforces the stamper 3. Therefore, even if the stamper 3 is thin, a disadvantage that the transfer quality is adversely affected by insufficient mechanical strength of the stamper 3 can be eliminated.

Figure 3A:
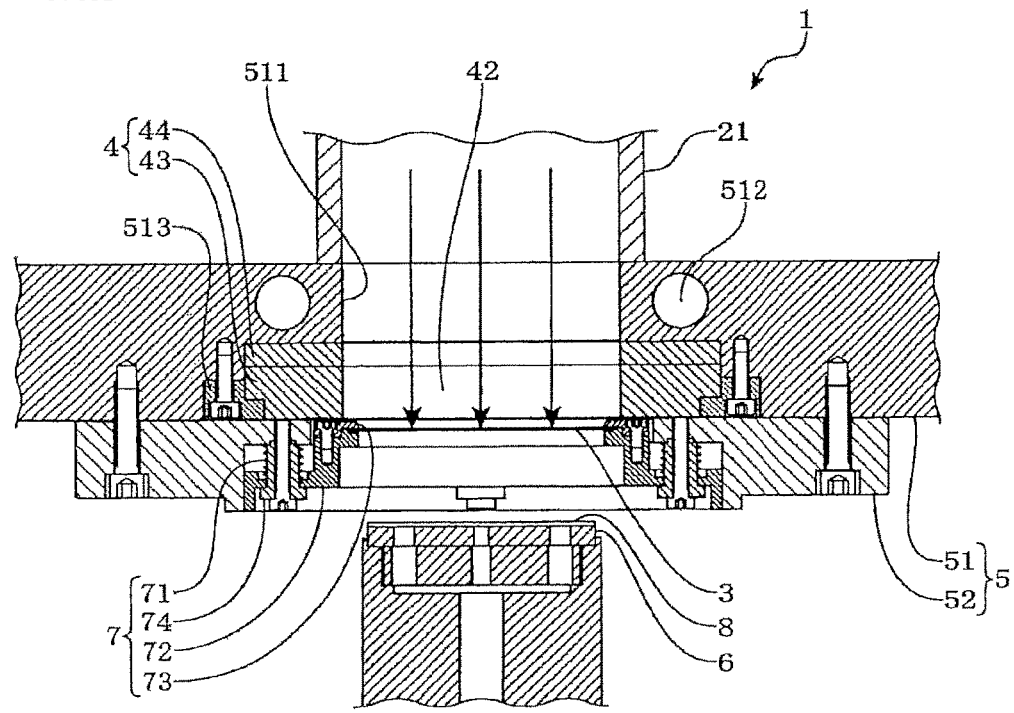
FIG. 3A is a schematic enlarged cross-sectional view for explaining essential parts of the molding apparatus according to the first example of the present invention during the heating step.
Figure 3B:
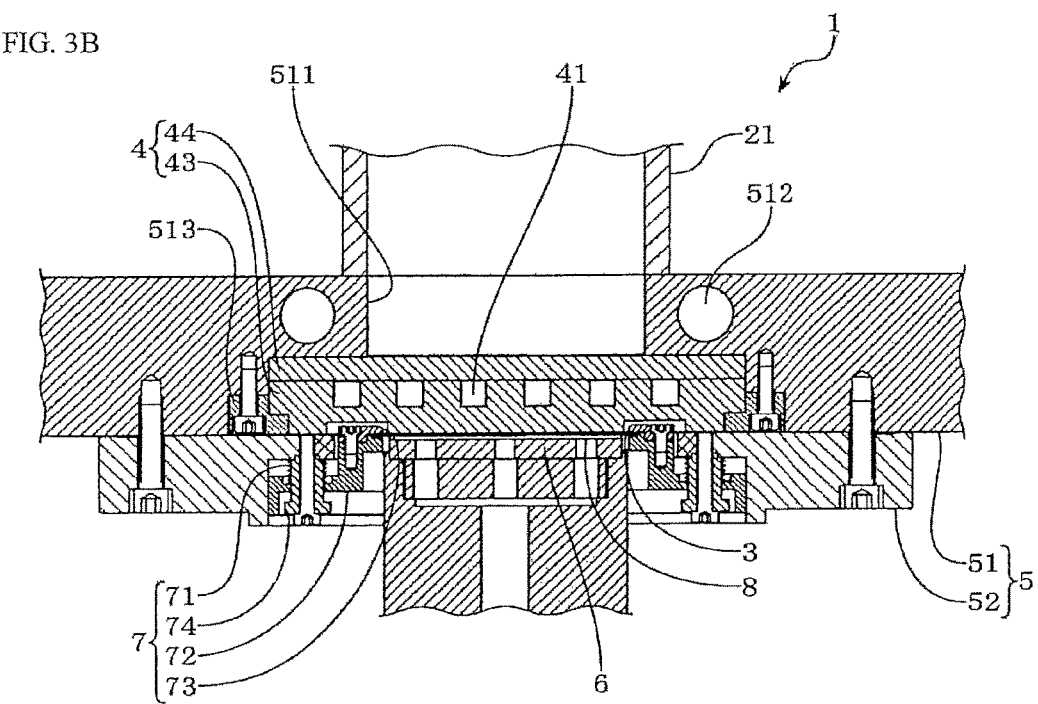
FIG. 3B is an enlarged cross-sectional view for explaining essential parts of the molding apparatus according to the first example of the present invention during the cooling step.

FIG. 3 is a schematic view for explaining essential parts of the molding apparatus according to the first example of the present invention, in which FIG. 3A is an enlarged cross-sectional view during the heating step; and FIG. 3B is an enlarged cross-sectional view during the cooling step.

Figure 4:
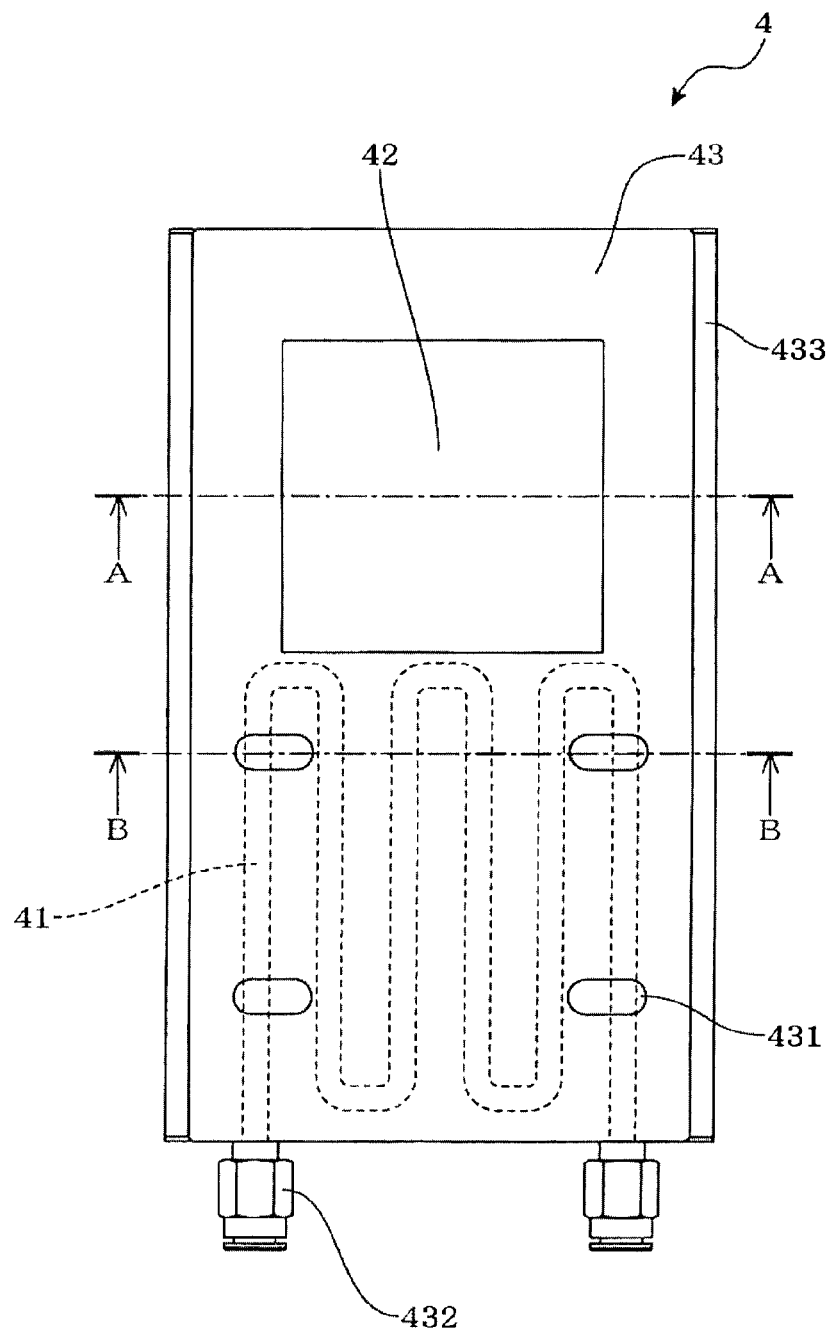
FIG. 4 is a schematic bottom view for explaining the cooling member of the molding apparatus according to the first example of the present invention.

FIG. 4 is a schematic bottom view for explaining the cooling member of the molding apparatus according to the first example of the present invention. The cross-sectional view taken along the line A-A in FIG. 4 is shown in FIG. 3A, and the cross-sectional view taken along the line B-B in FIG. 4 is shown in FIG. 3B.

In FIGS. 3 and 4, the cooling member 4 of the first example of the present invention has a lower plate 43 and an upper plate 44 that are in the form of a square plate. In each of the lower plate 43 and the upper plate 44, on one of sides obtained by dividing almost equally, a square opening part 42 that corresponds to the opening part 511 of the base part 51 is formed.

The side surface of the opening part 42 is normally a mirror surface as in the case of the light box 22 mentioned above.

In the lower plate 43, on the other side obtained by dividing almost equally, a channel 41 is formed meanderingly, and a joint 432 is linked to the both sides of the channel 41, and the upper plate 44 is stuck to the lower part 43 in the sealed state.

In the lower plate 43, at a position corresponding to a pressing member 73 mentioned later, an almost elliptic concave part 431 is formed, and as shown in FIG. 3B, interference with the pressing member 73 is eliminated. Further, in the lower plate 43, a supported part 433 is formed on the edge part on the both sides in such a manner that a step is formed. Due to engagement of the supported part 433 with the supporting element 513, the cooling member 4 is attached to the base part 51 such that it can be moved reciprocally in an almost horizontal direction.

In this example, the side surface of the opening part 42 is irradiated with infrared rays. However, for example, although not shown, by dividing the cooling member 4 into almost two equal parts, and by allowing each of them to move reciprocally, one of the parts of the thus divided cooling member 4 in which the channel 41 is formed can have a configuration in which infrared rays are not irradiated at all.

(First Mold)

As shown in FIG. 1, a first mold 5 has a structure in which it is provided with the base part 51, a holder 52 or the like, and a stamper-holding means 7 that holds the stamper 3 is installed in the first mold 5 such that it can be moved in an up-and-down direction, whereby the stamper 3 and the cooling member 4 are brought into contact with or is released from each other.

As mentioned above, the first mold 5 has an advancing and retreating means (not shown) that allows the cooling member 4 to advance to or retreat from the irradiation path of infrared rays.

Further, as shown in FIG. 3, the base part 51 in the first example is a plate-like member in which an opening part 511 is formed in the approximately center thereof, and the upper surface thereof is connected to a lower end of the light pipe 21. The opening part 511 is formed at a position almost corresponding to the light pipe 21, and has a cross-sectional shape which is almost the same as that of the light pipe 21. The side surface has a mirror surface formed by silver plating or the like as in the case of the inner surface of the light pipe 21 and the light box 22. As a result, the opening part 511 functions almost similarly as the light pipe 21, and allows light from the light source 23 to be uniformly irradiated on the upper surface of the stamper 3, whereby the surface to be irradiated can be uniformly heated.

Further, in the base part 51, in the lower part thereof, the cooling member 4 is attached so as to be moved reciprocally by a supporting member 513.

In the base part 51, in the upper part thereof, a channel 512 in which a coolant is circulated is formed, whereby the base part 51 and the cooling member 4 are forcedly cooled. Due to such a configuration, since temperature elevation in the cooling member 4 is suppressed, when the cooling member 4 cools the stamper 3 by bringing into contact with the stamper 3 that has been radiatingly heated, the stamper 3 can be cooled effectively.

A holder 52 is a plate-like member which is attached to the lower surface of the base part 51. On the lower surface thereof, a concave part for accommodating the stamper-holding means 7 that holds the stamper 3 is formed such that it can be moved in an up-and-down direction. Due to the presence of such holder 52, the stamper 3 is installed at a position that corresponds to the light pipe 21 and is below the cooling member 4 such that it can be moved in an up-and-down direction.

(Second Mold)

A second mold 6 is a plate-like member, and holds the base 8 to which the structure of the shape-forming surface 31 of the stamper 3 is transferred. That is, in the second mold 6, as shown in FIG. 3, a hole for vacuum suction is formed, and the base 8 is vacuum-sucked in the positioned state.

The first mold 5 and the second mold 6 are attached to a pressing machine (for example, a low-pressure pressing machine (pressing pressure: 1.0 MPa)). The second mold 6 is moved up and down, for example.

(Stamper-holding Means)

As shown in FIG. 1, the stamper-holding means 7 is an almost plate-like member, and holds the stamper 3 in such a manner that it can be relatively moved in order to allow the stamper 3 and the cooling member 4 to be brought into contact with or released from each other.

In this embodiment, the stamper-holding means 7 has a configuration in which it is attached to the first mold 5, and the second mold 6 and the stamper 3 are moved nearer to the cooling member 4 (first pattern). The configuration is not limited thereto. For example, although not shown, the stamper-holding means 7 may have a configuration in which the cooling member 4 and the stamper 3 are moved to the second mold 6 (second pattern) or in which the cooling member 4 and the second mold 6 are moved to the stamper 3 (third pattern). That is, holding the stamper 3 in a relatively movable manner means holding in any of the above-mentioned first, second and third patterns.

Here, it is preferred that the stamper-holding means 7 have an energizing member that energizes the stamper 3 that is held in the direction of the base 8 (in this embodiment, a compression spring 71).

Due to such a configuration, when the second mold 6 moves upward and the base 8 hits against the stamper 3, the stamper 3 is pressed against the base 8 in a stretched state. That is, even if the stamper 3 being held is deformed by curvature or deflection, the stamper 3 contacts the base 8 in a stretched state. Further, in this state (the state where the stamper 3 is stretched), the stamper 3 and the cooling member 4 are pressed. As a result, adverse effects such as curvature or deflection of the stamper 3 can be eliminated, whereby the transfer quality can be improved.

As the energizing member, a compression spring 71 or the like are normally used. The energizing member is not limited to a compression spring, and air pressure or the like may be used, for example.

Figure 5:
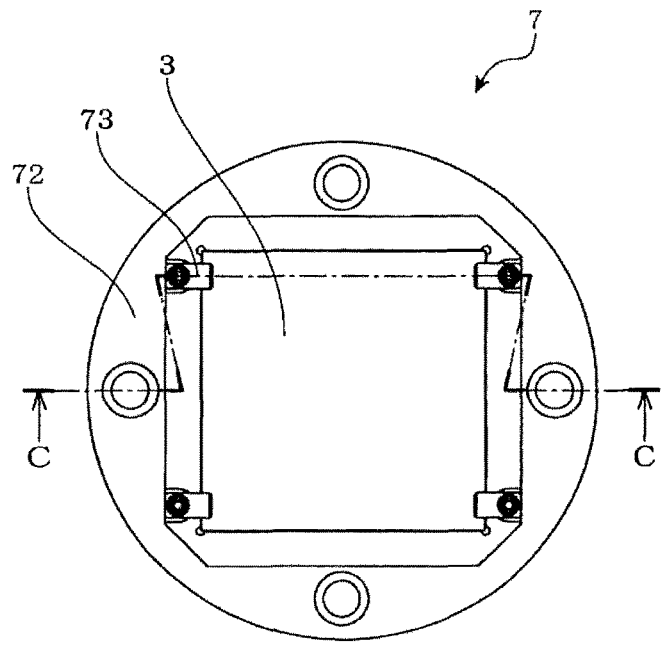
FIG. 5 is a schematic plan view for explaining the stamper-holding means of the molding apparatus according to the first example of the present invention.

FIG. 5 is a schematic plan view for explaining essential parts of the stamper-holding means of the molding apparatus according to the first example of the present invention. A cross-sectional view taken along the line C-C in FIG. 5 is shown in FIG. 3A.

In FIGS. 3 and 5, the stamper-holding means 7 in the first example is almost in a circular disc shape, and is provided with a supporting member 72 that supports the periphery of the stamper 3 that is almost square, four pressing members 73 that are screwed to the supporting member 72 in such manner that the stamper 3 is sandwiched therebetween and press each of the two locations of the opposing two sides of the stamper 3, four sleeves 74 that are screwed to the holder 52 in such a manner that they penetrate the holding member 72, four compression springs 71 that energize the stamper-holding means 7 in the direction of the stamper 3, or the like.

The pressing member 73 normally presses at least one part (other than the shape-forming surface 31) of the stamper 3. In this example, it presses the periphery of the stamper 3.

The configuration of the stamper-holding means 7 that holds the stamper 3 is not limited to the above-mentioned configuration.

The molding apparatus 1 of this embodiment has various modification examples.

Figure 6:
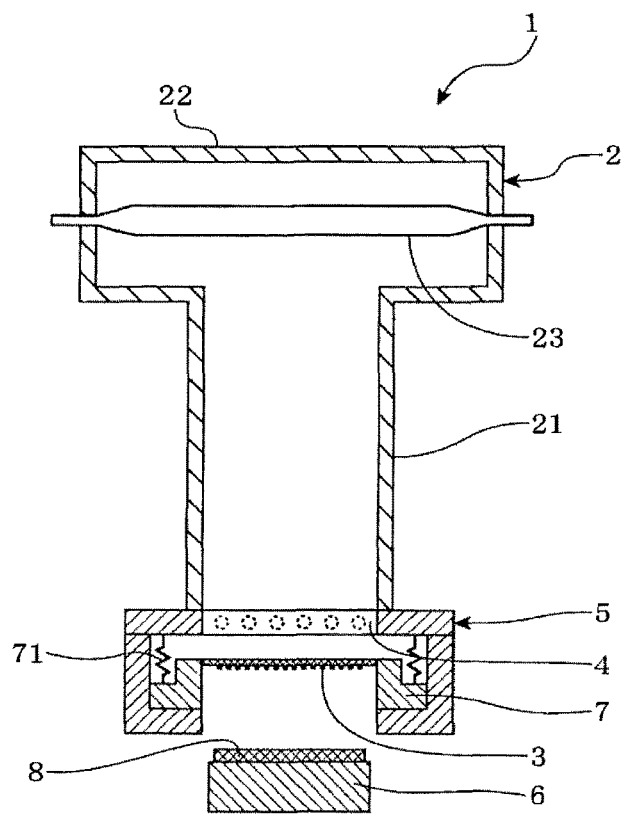
FIG. 6 is a schematic cross-sectional view for explaining the molding apparatus according to a modification example of the present invention.

In this embodiment, infrared rays are shielded by using the shutter 24. The manner of shielding infrared rays is not limited thereto, and for example, as shown in FIG. 6, a configuration is possible in which the cooling member 4 shields infrared rays. Due to such a configuration, a molding apparatus 1' does not require the shutter 24, leading to reduction in production cost.

Other than those mentioned above, the molding apparatus 1' according to the modification example has almost the same configuration as the molding apparatus 1 of this embodiment except for the points mentioned above.

Next, the operations of the molding apparatus 1' having the above-mentioned configuration, the first embodiment of the method for molding a thermoplastic resin product or the like will be explained with reference to the drawings. The operations of the molding apparatus 1' according to the modification example differs from the molding apparatus 1 of this embodiment in that the cooling member 4 shields infrared rays instead of the shutter 24, and other operations are almost the same as those of the molding apparatus 1.

FIG. 7 is a schematic cross-sectional view for explaining the method for molding according to the first embodiment of the present invention.

In FIG. 7, the method for molding of this embodiment is a method in which compression molding is conducted for the base 8 by means of the molding apparatus 1', and includes a heating step, a transfer step, a cooling step and a mold-releasing step.

In this embodiment, the material of the base 8 is a thermoplastic resin such as polyethylene terephthalate, but the material is not limited thereto. For example, the material of the base 8 may be an amorphous thermoplastic resin. A crystalline thermoplastic resin is solidified when cooled, and an amorphous thermoplastic resin is hardened when cooled.

(Heating Step)

Figure 7A:
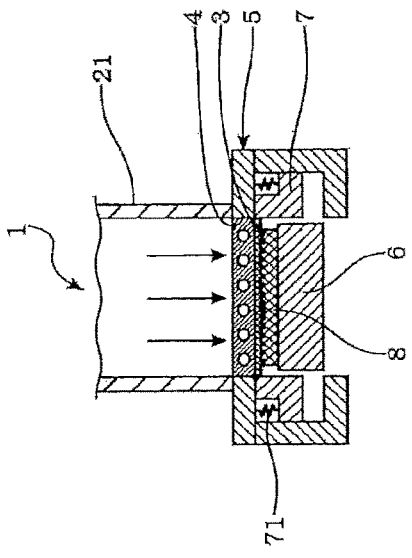
FIG. 7A is a schematic cross-sectional view for explaining the method for molding according to the first embodiment of the present invention.

In the heating step, as shown in FIG. 7A, in the molding apparatus 1', the second mold 6 is positioned below the first mold 5, and the stamper 3 is irradiated with infrared rays emitted from the heating apparatus 2, whereby the stamper 3 is radiatingly heated.

In the heating step, the stamper 3 is irradiated with infrared rays in the state where the cooling member 4 is not irradiated with infrared rays. In order not to irradiate the cooling member 4 with infrared rays, the cooling member 4 is released from the stamper 3, and normally, the cooling member 4 is retreated from the infrared ray irradiation path.

Due to such a configuration, when the stamper 3 is radiantly heated by infrared rays emitted from the heating apparatus 2, since the cooling member 4 is retreated from the irradiation path of infrared rays, the cooling member 4 is not at all or almost not heated with infrared rays. That is, in the molding apparatus 1', by using the cooling member 4 that is cooler since it is not heated by infrared rays, the cooling time can be shortened, whereby productivity can be improved.

Further, by using the cooling member 4 made of a material having a thermal conductivity higher than that of an infrared rays-transmitting material such as aluminum and copper, the cooling time can be shortened, and productivity can be improved.

Further, in this embodiment, transfer is conducted in the transfer step by only using heat stored by the stamper 3 in the heating step.

In order to store the amount of heat required for the transfer, the thickness of the stamper 3, the pre-heat temperature for the base 8 or the like are appropriately set.

When radiation heating of the stamper with infrared rays emitted from the heating apparatus 2 starts, normally, the base 8 is held by the second mold 6. The start of the radiation heating is, however, not limited to this timing. For example, the base 8 may be held by the second mold 6 during the radiation heating. By this configuration, the molding cycle time can be shortened in the automated continuous molding.

(Transfer Step)

Figure 7C:
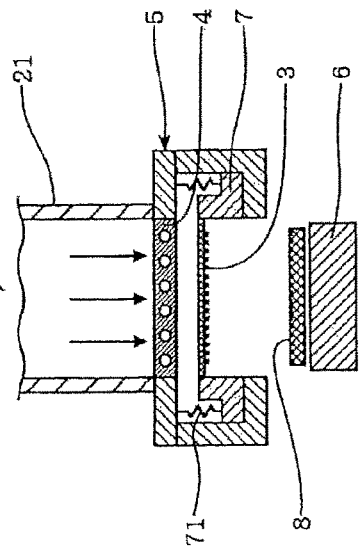
FIG. 7C is a schematic cross-sectional view for explaining the method for molding according to the first embodiment of the present invention.
Figure 7B:
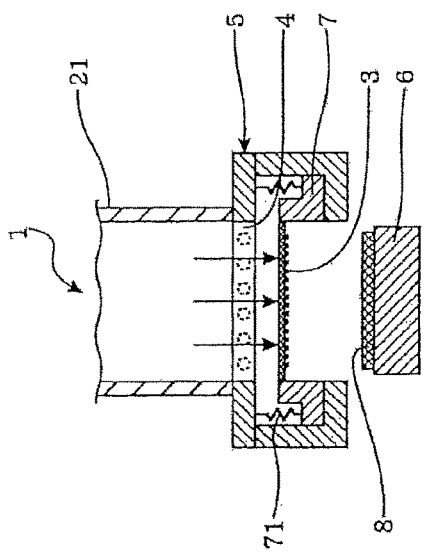
FIG. 7B is a schematic cross-sectional view for explaining the method for molding according to the first embodiment of the present invention.

Subsequently, in the transfer step, as shown in FIG. 7B, in the molding apparatus 1', the structure of the shape-forming surface 31 of the radiatingly heated stamper 3 is transferred to the transfer surface 81 of the base 8. That is, in this transfer step, the second mold 6 is lifted up, the transfer surface 81 of the base 8 is brought into contact with the shape-forming surface 31 of the stamper 3, and subsequently, the stamper 3 is moved upward as it is pushed up. In the state where the stamper 3 is in contact with the cooling member 4, the transfer surface 81 is pressed against the shape-forming surface 31, whereby the structure of the shape-forming surface 31 is transferred to the transfer surface 81 of the base 8.

In this transfer step, the cooling member 4 enters the irradiation path of infrared rays.

At least in the final stage of the transfer step, the stamper 3 is in contact with the cooling member 4 that has entered the irradiation path of infrared rays. That is, at least in the final stage of the transfer step, as shown in FIG. 7C, the stamper 3 is in contact with the cooling member 4, and the cooling member 4 reinforces the stamper 3.

Due to such a configuration, even when the thickness of the stamper 3 is several hundreds μm and the mechanical strength thereof is low, at least in the final stage of the transfer step, the cooling member 4 is in contact with the stamper 3 and transfer is finished in the state where the stamper 3 is reinforced by the cooling member 4, a disadvantage that transfer is completed in the state where the stamper 3 is deformed by curvature or deflection can be prevented, whereby transfer accuracy and the like can be improved.

Further, since the cooling member 4 functions as the reinforcing member of the stamper 3 in the transfer step, the stamper 3 can be thin, whereby the heating time and the cooling time can be shortened.

Here, it is preferred that, in the transfer step, the stamper 3 be energized in the direction of the base 8. Due to such a configuration, the second mold 6 is moved upward and the base 8 is brought into contact with the stamper 3, and further the second mold 6 is moved upward, the stamper 3 is pressed against the base 8 by the compression spring 71. As a result, the stamper 3 is in the stretched state, and transfer can be conducted in the state where curvature, deflection or the like of the stamper 3 can be reduced, whereby transfer quality can be improved.

(Cooling Step)

Subsequently, in the cooling step, as shown in FIG. 7C, the molding apparatus 1' allows the stamper 3 to be in contact with the cooling member 4. The cooling member 4 cools the base 8 through the stamper 3, thereby to solidify or harden the base 8. That is, transfer is completed when the stamper 3 is brought into contact with the cooling member 4 and the base 8 is pressed against the stamper 3 in this state. Further, when the stamper 3 is brought into contact with the cooling member 4, the stamper 3 is cooled by thermal conductance to the cooling member 4, and the base 8 is cooled by thermal conductance to the stamper 3.

It is preferred that cooling by the cooling step start after the start of transfer by the transfer step. The time when transfer starts means the time when the base 8 is brought into contact with the stamper 3 that has been heated. The time when cooling starts means the time when the stamper 3 that is in contact with the base 8 is brought into contact with the cooling member 4.

By this, it is possible to stabilize the temperature of the stamper 3 when transfer starts, whereby reliability of transfer quality can be improved.

In the molding apparatus 1', the cooling member 4 shields infrared rays. Therefore, although the cooling member 4 is irradiated with infrared rays, the cooling member 4 is cooled to a predetermined temperature by the channel 41 for circulating a coolant. As a result, the stamper 3 can be effectively cooled, the cooling time can be shortened, whereby productivity can be improved.

In the molding apparatus 1 of this embodiment, since the shutter 24 shields infrared rays in the cooling step, it is possible to use the cooling member 4 that is cooler since it is not heated by infrared rays can be used. As a result, the cooling time can be shortened, whereby productivity can be significantly improved.

(Mold-releasing Step)

Figure 7D:
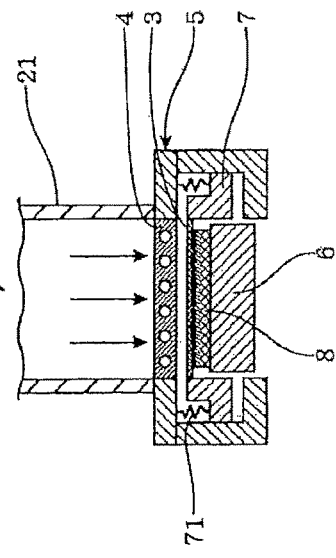
FIG. 7D is a schematic cross-sectional view for explaining the method for molding according to the first embodiment of the present invention.

Subsequently, in the mold-releasing step, in the molding apparatus 1', as shown in FIG. 7D, by releasing the state where the shape-forming surface 31 is pressed against the transfer surface 81, the molded product is removed from the mold (mold-releasing step). That is, in this mold-releasing step, the second mold 6 is lowered, and the stamper 3 is separated from the cooling member 4 and is moved downward. Then, the transfer surface 81 is separated from the shape-forming surface 31, and the second mold 6 is lowered to the original position (that is, a position below the first mold 5). Thereafter, the base 8 is transported, whereby one cycle of molding is completed.

As explained hereinabove, according the molding apparatuses 1 and 1' and the method for molding according to this embodiment, since the stamper 3 is radiatingly heated in the heating step in the state where the cooling member 4 is not irradiated with infrared rays emitted from the heating apparatus 2, it is possible to use the cooling member 4 that is cooler since it is not heated by infrared rays can be used. As a result, the cooling time can be shortened, whereby productivity can be significantly improved.

Further, when the stamper 3 is deformed from the flat state by curvature, deflection or the like, it is possible to suppress deformation of the stamper 3, and to conduct transfer in the flat state, whereby transfer quality can be improved.

This embodiment has various application examples.

Next, application examples of this embodiment will be explained with reference to the drawings.

<First Application Example of a Thermoplastic Resin Product>

FIG. 8 is a schematic cross-sectional view for explaining the method for molding according to the first application example of the present invention.

In FIG. 8, the method for molding according to the first application example differs from the above-mentioned embodiment in that the stamper 3 is radiatingly heated also in the transfer step. Other methods in this application example are almost the same as those in the above-mentioned embodiment.

Therefore, in FIG. 8, for the points of the methods that are the same as those in FIG. 7, a detailed explanation is omitted.

The molding method according to the first application example is a molding method using the molding apparatus 1. The method is not limited thereto, and molding may be conducted by using the molding apparatus 1' used in the modification example.

(Heating Step)

Figure 8A:
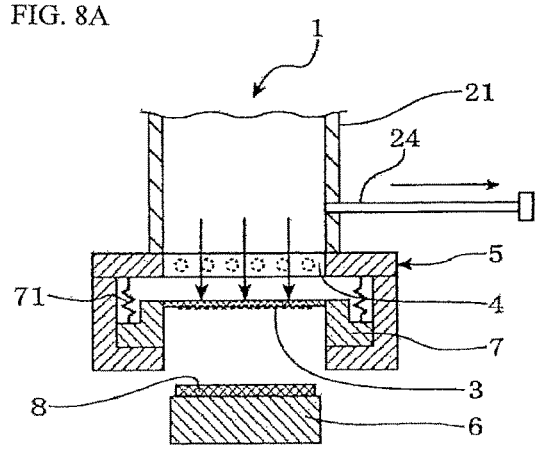
FIG. 8A is a schematic cross-sectional view for explaining the method for molding according to the first application example of the present invention.

In the heating step, as shown in FIG. 8A, in the molding apparatus 1, the shutter 24 is opened, the second mold 6 is positioned below the first mold 5, and the stamper 3 is irradiated with infrared rays emitted from the heating apparatus 2, whereby the stamper 3 is radiatingly heated.

In this heating step, in substantially the same manner as in the above-mentioned embodiment, the cooling member 4 is retreated from the irradiation path of infrared rays, and the stamper 3 is irradiated with infrared rays in the state where the cooling member 4 is not irradiated with infrared rays.

(Transfer Step)

Figure 8D:
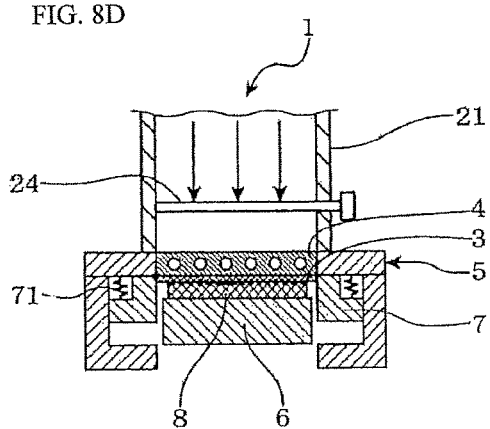
FIG. 8D is a schematic cross-sectional view for explaining the method for molding according to the first application example of the present invention.
Figure 8B:
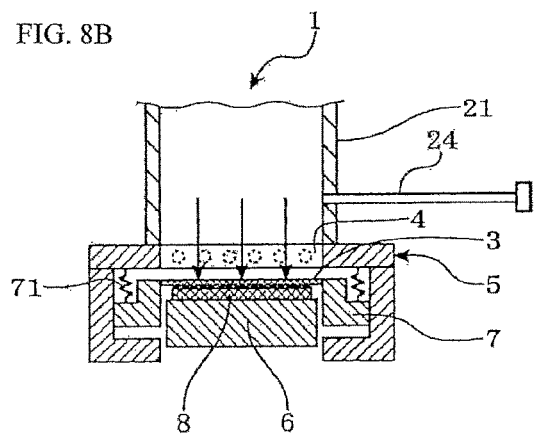
FIG. 8B is a schematic cross-sectional view for explaining the method for molding according to the first application example of the present invention.

Subsequently, in the transfer step, as shown in FIG. 8B, in the molding apparatus 1, the base 8 is brought into contact with the stamper 3 that has been radiantly heated, whereby transfer starts. That is, the second mold 6 is lifted up, the transfer surface 81 of the base 8 is brought into contact with the shape-forming surface 31 of the stamper 3, and subsequently, the stamper 3 is moved upward as it is pushed up, and stops at a position below the cooling member 4 that enters afterwards. During that time, the shutter 24 is in the opened state. Since the cooling member 4 does not enter the irradiation path of infrared rays, the stamper 3 is irradiated with infrared rays, and the stamper 3 is heated. The base 8 that is pressed against the stamper 3 is heated by thermal conductance. Then, a thermoplastic resin of the transfer surface 81 of the base 8 and its vicinity can be molten or softened, whereby the structure of the shape-forming surface 31 of the stamper 3 is transferred to the transfer surface 81 of the base 8.

By this, since the stamper 3 is radiantly heated in the state where the stamper 3 is in contact with the base 8, the temperature control of the base 8 can be conducted accurately. In addition, the temperature profile of the base 8 can be readily controlled, whereby further minute transfer can be conducted, transfer accuracy is improved or other merits can be attained.

Figure 8E:
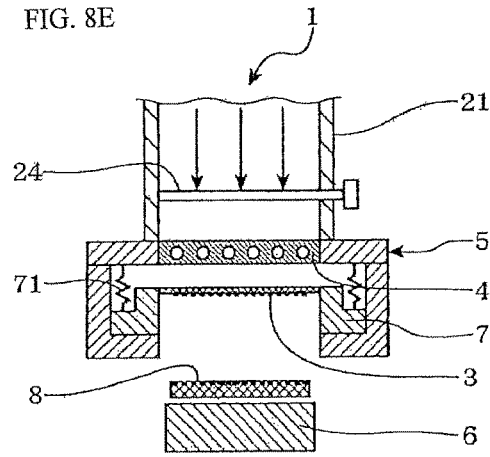
FIG. 8E is a schematic cross-sectional view for explaining the method for molding according to the first application example of the present invention.
Figure 8C:
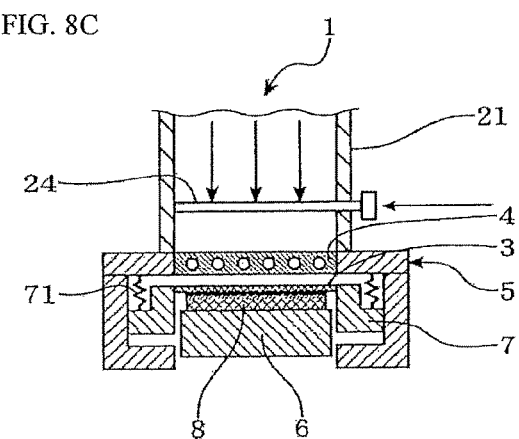
FIG. 8C is a schematic cross-sectional view for explaining the method for molding according to the first application example of the present invention.

Subsequently, in the transfer step, as shown in FIG. 8C, in the molding apparatus 1, in the state where the base 8 is pressed against the stamper 3, the shutter 24 is closed and the cooling member 4 enters the irradiation path of infrared rays.

At least in the final stage of the transfer step, as in almost the same manner as in the above-mentioned embodiment, the stamper 3 is in contact with the cooling member 4 that has entered the irradiation path of infrared rays. That is, at least in the final stage of the transfer step, as shown in FIG. 8D, the stamper 3 is in contact with the cooling member 4. By this, as mentioned above, transfer is finished in the state where the stamper 3 is reinforced by the cooling member 4, a disadvantage that transfer is completed in the state where the stamper 3 is deformed by curvature, deflection or the like can be prevented, whereby transfer accuracy and the like can be improved.

(Cooling Step)

Subsequently, in the cooling step, as shown in FIG. 8D, in the molding apparatus 1, the stamper 3 is brought into contact with the cooling member 4, and the base 8 is cooled through the stamper 3, thereby to solidify or harden the base 8. That is, transfer is completed when the stamper 3 is brought into contact with the cooling member 4 and the base 8 is pressed against the stamper 3 in this state. Further, when the stamper 3 is brought into contact with the cooling member 4, the stamper 3 is cooled by thermal conductance to the cooling member 4, and the base 8 is cooled by thermal conductance to the stamper 3.

This cooling step is almost the same as the cooling step in the above-mentioned embodiment.

(Mold-releasing Step)

Subsequently, in the mold-releasing step, in the molding apparatus 1, as shown in FIG. 8E, by releasing the state where the shape-forming surface 31 is pressed against the transfer surface 81, the molded product is removed from the mold. That is, in this mold-releasing step, the second mold 6 is lowered, and the stamper 3 is separated from the cooling member 4 and is moved downward. Then, the transfer surface 81 is separated from the shape-forming surface 31, and the second mold 6 is lowered to the original position. Thereafter, the base 8 is transported, whereby one cycle of molding is completed.

As explained above, according the method for molding according to this application example, not only almost similar effects as those attained by the above-mentioned embodiment can be attained, but also the stamper 3 is radiatingly heated in the transfer step. By this, since the stamper 3 is radiantly heated in the state where the stamper 3 is in contact with the base 8, the temperature control of the base 8 can be conducted accurately. In addition, the temperature profile of the base 8 can be readily controlled, whereby further minute transfer can be conducted, transfer accuracy is improved or other merits can be attained.

<Second Application Example of the Method for Molding a Thermoplastic Resin Product>

Figure 9:
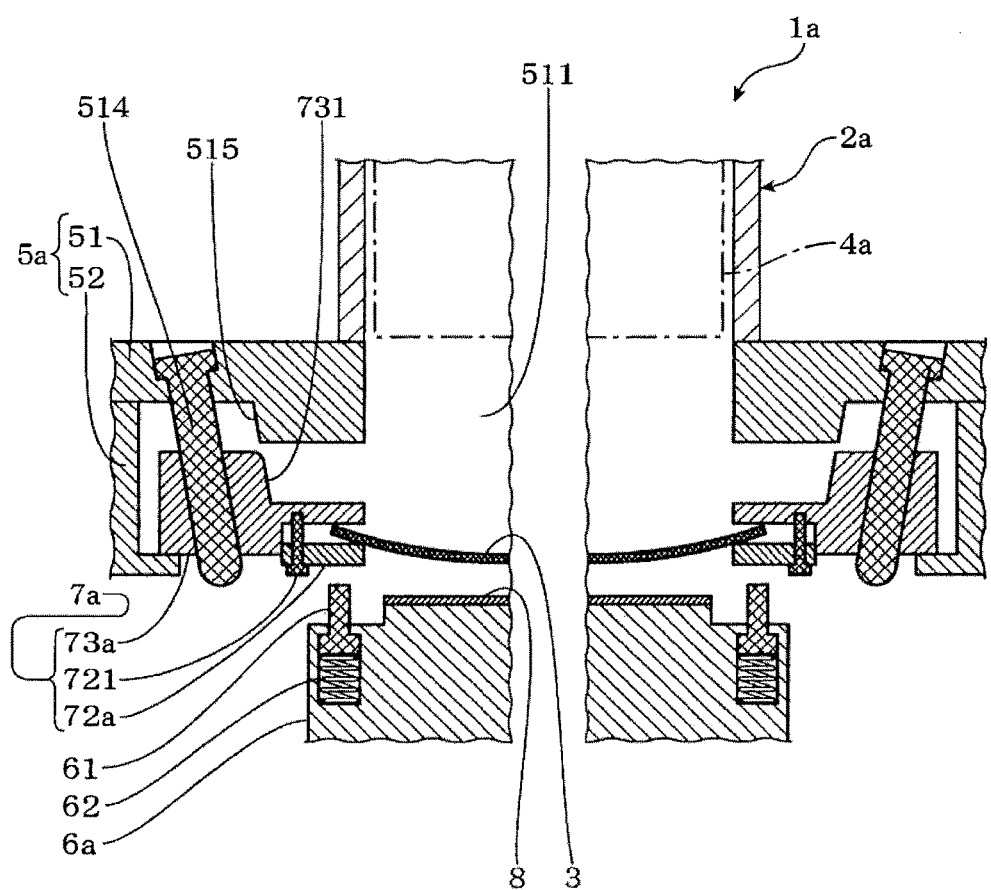
FIG. 9 is a schematic cross-sectional view for explaining essential parts of the molding apparatus used in the method for molding according to the second application example of the present invention.

FIG. 9 is a schematic cross-sectional view for explaining essential parts of the molding apparatus used in the method for molding according to the second application example of the present invention.

In FIG. 9, a molding apparatus 1a used in the method for molding according to the second application example differs from the molding apparatus 1 of the above-mentioned embodiment in that it is provided with a heating apparatus 2a instead of the heating apparatus 2, a cooling member 4a instead of the cooling member 4, a stamper-holding means 7a instead of the stamper-holding means 7, and further provided with a guide pin 514, a guide surface 515, a pressing pin 61 and a compression spring 62. Other configurations of the molding apparatus 1a are almost the same as those of the above-mentioned molding apparatus 1.

In FIG. 9, constituting elements which are similar to those in FIG. 1 are indicated by the same referential numerals, and a detailed explanation is omitted.

The heating apparatus 2a differs from the heating apparatus 2 in that, although not shown, it has a moving means such as a three-axis robot and can be moved from a position that corresponds to the opening part 511. This heating apparatus 2a is, as mentioned later, at a position corresponding to the opening part 511 in the heating step. In the transfer step, the cooling step and the mold-releasing step, it moves from the position corresponding to the opening part 511, and to the position corresponding to the opening part 511, the cooling member 4a is moved.

Other configurations of the heating apparatus 2a are almost same as those of the above-mentioned heating apparatus 2.

The cooling member 4a differs from the cooling member 4 in that, although not shown, it has a moving means such as a three-axis robot and can be moved to a position that corresponds to the opening part 511. This cooling member 4a is, as mentioned later, at a position that does not correspond to the opening part 511 in the heating step. In the transfer step, the cooling step and the mold-releasing step, it moves to a position that corresponds to the opening part 511.

Other configurations of the cooling member 4a are almost same as those of the above-mentioned cooling member 4.

The first mold 5a differs from the first mold 5 in that the base part 51 is provided with the guide pin 514 and the guide surface 515.

The guide pin 514 is secured to the base part 51 such that the front end side protrudes diagonally downward of the base part 51, and the front end side is inserted into the bore of a pressing member 73a. This guide pin 514 positions the pressing member 73 in a movable manner.

The guide surface 515 is an inclined surface that is formed such that it protrudes below the base part 51, and is engaged with a guided surface 731 of the pressing member 73a, and when the pressing member 73a is moved upward, allows the pressing member 73a to move in the outward direction.

Other configurations of the first mold 5a are almost same as those of the above-mentioned first mold 5.

A second mold 6a differs from the second mold 6 in that it is provided with a pressing pin 61 and a compression spring 62.

The pressing pin 61 is provided liftably at a position that is outside of the base 8 and corresponds to the supporting member 72a, and is energized upwardly by the compression spring 62.

Other configurations of the second mold 6a are almost same as those of the above-mentioned first mold 6.

The stamper-holding means 7a is provided with a supporting member 72a, a bolt 721 and the pressing member 73a or the like.

The supporting member 72a has an almost rectangular flat shape, and is liftably arranged through the bolt 721 at an almost corresponding position to the pressing member 73 shown in FIG. 5.

The pressing member 73a has an almost rectangular rod shape, and holes are formed in the vicinity of the both sides, through which the guide pin 514 is inserted. Further, in the pressing member 73a, on each of the supporting members 72a, a concave part that has an almost rectangular flat shape is formed.

Other configurations of the stamper-holding means 7a are almost same as those of the above-mentioned stamper-holding means 7.

In the molding apparatus 1a having the above configuration, when the stamper-holding means 7a which holds the stamper 3 and has the guided surface 731 rises, the guided surface 731 engages with the guide surface 515, whereby the stamper-holding means 7a is moved outwardly. That is, in the stamper-holding means 7a, the pressing member 73a or the like functions as a pulling means that pulls outwardly the stamper 3 that is held.

By this, even in the state where the stamper 3 is deformed such as being curved or deflected, the stamper 3 is forcedly in a stretched state, and the stamper 3 in the stretched state is brought into contact with the base 8. Further, the stamper 3 is pressed against the cooling member 4 in a state that the stamper 3 is stretched. As a result, it is possible to eliminate the adverse effects of such curvature and deflection of the stamper 3, whereby the transfer quality can be improved.

As the energizing member, a compression spring 71 or the like are normally used. The energizing member is not limited to a compression spring, and air pressure or the like may be used, for example.

In a molding apparatus 1a, in the heating step, the supporting member 72a is positioned below (at a position where the lower surface is in contact with the head portion of the bolt 721), and supports the periphery of the stamper 3. When the stamper 3 is heated, normally, the stamper 3 is bent downwardly, and as shown in FIG. 9, the supporting member 72a usually supports the stamper 3 in the state of line contact. By this, as compared with a case where the stamper 3 is supported in the state of surface contact, the stamper 3 can be uniformly heated.

Moreover, in the molding apparatus 1a, in the transfer step, the cooling step and the mold-releasing step, the supporting member 72a is moved upward by the pushing pin 61 that is lifted up, and the convex part of the pressing member 73a presses the stamper 3, and holds the stamper 3 such that it sandwiches the stamper 3 (see FIG. 10). The pushing pin 61 or the like functions as a means for moving the support part and the pressing part that moves the supporting member 72a.

Next, the operation of the molding apparatus 1a having the above-mentioned configuration and the second application example of the method for molding will be explained with reference to the drawings.

(Heating Step)

In the heating step, in the molding apparatus 1a, as shown in FIG. 9, the heating apparatus 2a is positioned above the opening part 511 (the cooling member 4a is released from the above of the opening part 511), the second mold 6a is positioned below the first mold 5a, the shutter 24 is opened, and the stamper 3 is irradiated with infrared rays emitting from the heating apparatus 2, whereby the stamper 3 is radiatingly heated.

At this time, the stamper 3 that has been radiatingly heated is normally bent downwardly, the supporting member 72a supports the stamper 3 in the line contact state. Therefore, as compared with a case where the stamper 3 is supported in the surface-contact state, the stamper 3 can be heated uniformly, whereby the heating time and the cooling time can be shortened.

Other methods in the heating step are almost the same as those of the heating step of the above-mentioned embodiment, and almost similar effects as those attained by the above-mentioned embodiment can be attained.

(Transfer Step)

FIG. 10 is a schematic cross-sectional view for explaining the method for molding according to the second application example of the present invention.

Figure 10A:
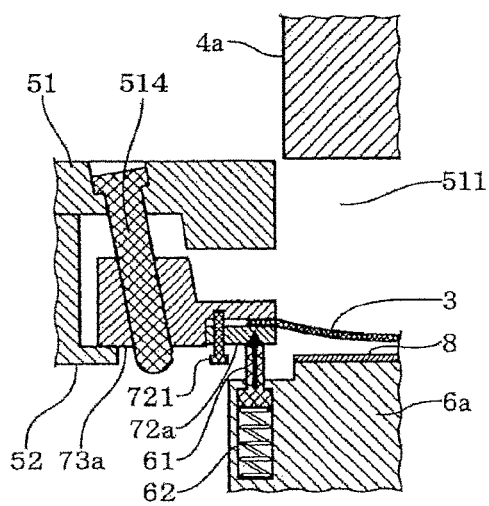
FIG. 10A is a schematic cross-sectional view for explaining the method for molding according to the second application example of the present invention.

Next, in the transfer step, as shown in FIG. 10A, in the molding apparatus 1a, the heating apparatus 2a of which the shutter 24 is closed is moved from above the opening part 511, and the cooling member 4a is moved to above the opening part 511. Further, the second mold 6a is lifted up, the pushing pin 61 allows the supporting member 72a to be lifted up, and the stamper 3 is held such that it is sandwiched between the supporting member 72a and the convex part of the pressing member 73a.

At this time, the stamper 3 is still in the bent state.

Figure 10B:
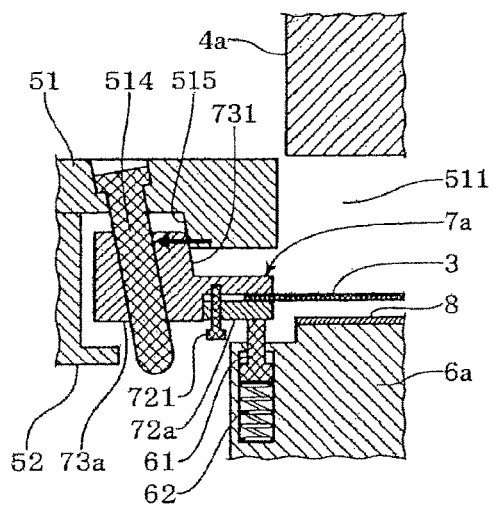
FIG. 10B is a schematic cross-sectional view for explaining the method for molding according to the second application example of the present invention.

Subsequently, when the second mold 6a is further lifted up, as shown in FIG. 10B, the stamper-holding means 7a is lifted up, the guided surface 731 is engaged with the guide surface 515, whereby the stamper-holding means 7a is moved outwardly. As a result, the stamper 3 is in the stretched state, and the stamper-holding means 7a stops.

Figure 10C:
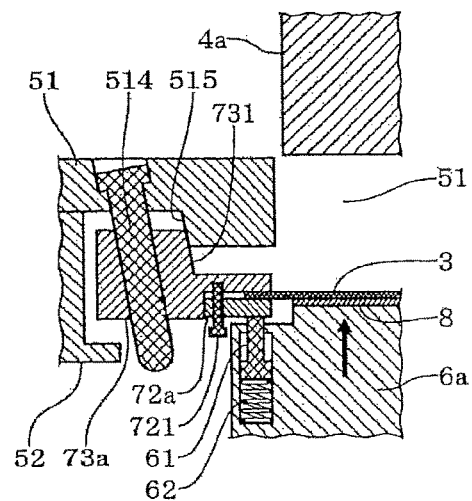
FIG. 10C is a schematic cross-sectional view for explaining the method for molding according to the second application example of the present invention.

Further, when the second mold 6a is moved upward, as shown in FIG. 10C, the compression spring 62 is further compressed, and the base 8 is brought into contact with the stamper 3 in the stretched state. When the base 8 is brought into contact with the stamper 3, or when the base 8 is brought into contact with the stamper 3 and pushes the base 8 upward by a small distance (for example, 0. several mm), the second mold 6a stops. By this, transfer can be conducted in the state where the curvature, deflection or the like of the stamper 3 is suppressed, whereby transfer quality of the like can be improved.

(Cooling Step)

Figure 10D:
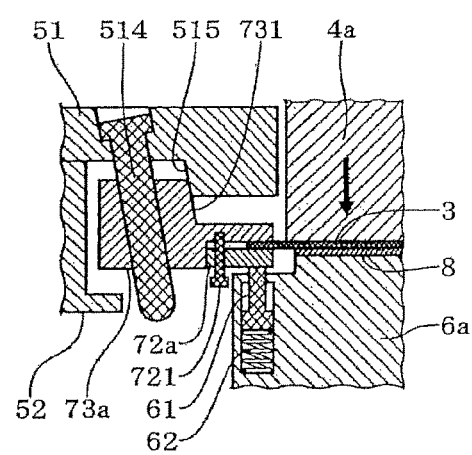
FIG. 10D is a schematic cross-sectional view for explaining the method for molding according to the second application example of the present invention.

Subsequently, in the cooling step, as shown in FIG. 10D, in the molding apparatus 1a, the cooling member 4a is lowered, thereby to press the stamper 3.

Here, as mentioned above, when the stamper 3 is brought in contact with the base 8, transfer starts. By pressing of the cooling member 4a against the stamper 3 at a prescribed pressing pressure, the transfer step, in which the shape-forming surface 31 of the stamper 3 that has been radiatingly heated is transferred to the transfer surface 81 of the base 8, is completed.

Further, when the cooling member 4a is brought into contact with the stamper 3, cooling starts, and the cooling member 4a cools the base 8 through the stamper 3, thereby to solidify or harden the base 8.

Other methods in the cooling step are almost the same as those of the cooling step of the above-mentioned embodiment, and almost similar effects as those attained by the above-mentioned embodiment can be attained.

(Mold-releasing Step)

Subsequently, in the mold-releasing step, in the molding apparatus 1a, by repeating the above-mentioned operation in the reverse manner, i.e. by moving the cooling member 4a upward, moving the second mold 6a downward, and releasing the state in which the shape-forming surface 31 is pressed against the transfer surface 81, a molded product is released from the mold.

Thereafter, the base 8 is transported, the cooling member 4a is moved from the part above the opening part 511 and the heating apparatus 2a is moved to the part above the opening part 511, whereby one cycle of molding is completed.

As explained above, according the method for molding and the molding apparatus 1a according to this application example, not only almost similar effects as those attained by the above-mentioned embodiment can be attained, but also the stamper 3 that has been radiatingly heated is supported in the line contact state, and hence, as compared with a case where the stamper 3 is supported in the state of surface contact, the stamper 3 can be uniformly heated, whereby the heating time and the cooling time can be shortened.

Further, in the transfer state, the stamper 3 is allowed to be a forcedly stretched state, transfer can be conducted in the state where curvature, deflection or the like of the stamper 3 can be reduced, whereby transfer quality can be improved.

[Second Embodiment of the Apparatus for Molding a Thermoplastic Resin Product and the Method for Molding]

Figure 11A:
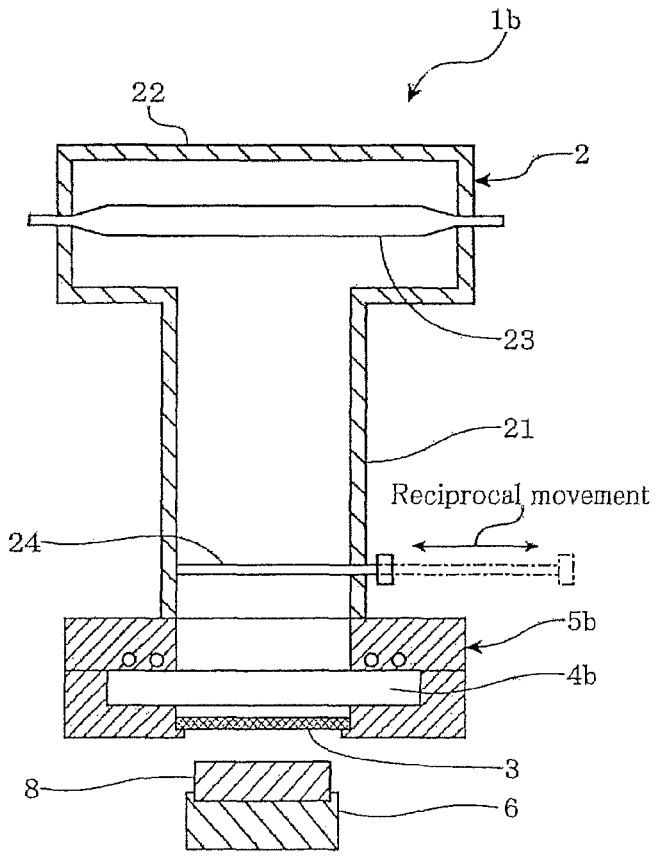
FIG. 11A is a schematic cross-sectional view for explaining the apparatus for molding a thermoplastic resin product according to the second embodiment of the present invention.
Figure 11B:
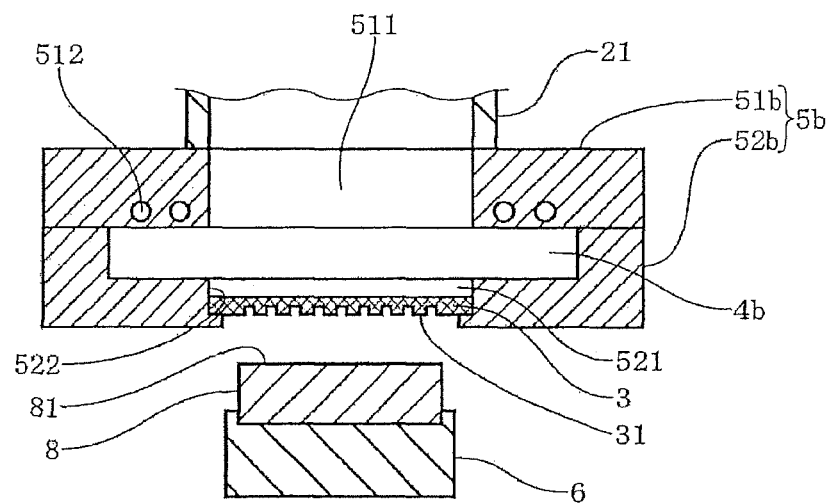
FIG. 11B is a schematic enlarged cross-sectional view of essential parts for explaining the apparatus for molding a thermoplastic resin product according to the second embodiment of the present invention.

FIG. 11 is a schematic view for explaining the apparatus for molding a thermoplastic resin product according to the second embodiment of the present invention, in which FIG. 11A is a cross-sectional view and FIG. 11B is an enlarged cross-sectional view of essential parts.

In FIG. 11, a molding apparatus 1b for molding a thermoplastic resin product according to the second embodiment (hereinafter appropriately abbreviated as the "molding apparatus 1b") has a configuration in which it is provided with the heating apparatus 2, the stamper 3, a cooling member 4b, a first mold 5b, the second mold 6 or the like. In this molding apparatus 1b, the stamper 3 is radiatingly heated at least in a state where it is released from the cooling member 4b, and the structure of the shape-forming surface 31 of the stamper 3 that has been radiatingly heated is transferred to the transfer surface of a thermoplastic resin.

Here, the "stamper 3 is radiatingly heated at least in a state where it is remote from the cooling member 4b" means that the stamper 3 is radiatingly heated in a state where it is released from the cooling member 4b and the stamper 3 may further be radiatingly heated in a state where the stamper 3 is in contact with the cooling member 4*b*.

In FIG. 11, constituting elements which are almost similar to those in FIG. 1 are indicated by the same referential numerals, and a detailed explanation is omitted.

(Cooling Member)

The cooling member 4*b* differs from the above-mentioned cooling member 4 in that the channel 41 is not formed and it is provided below a base part 51*b* of the first mold 5*b* so as to be reciprocally moved in the horizontal direction. Other configurations or the like are almost the same as those of the cooling member 4.

(First Mold)

The first mold 5*b* is provided with the base part 51*b*, the holder 52*b* or the like, and has a configuration that enables the stamper 3 to be held in such a manner that it can be moved in an up-and-down direction and the stamper 3 is brought into contact with or released from the cooling member 4*b*. As almost in the same manner as in the above-mentioned first embodiment, the first mold 5*b* has an advancing/retreating means (not shown) that allows the cooling member 4*b* to advance to or retreat from the irradiation path of infrared rays.

The configuration of this embodiment is a configuration in which the stamper 3 is held so as to be movable in an up-and-down direction and the cooling member 4*b* cannot be moved in an up-and-down direction. The configuration is, however, not limited thereto. For example, although not shown, a configuration is possible in which the stamper 3 cannot be moved in an up-and-down direction, and the cooling member 4*b* is held so as to be movable in an up-and-down direction or the stamper 3 and the cooling member 4*b* are held so as to be movable in an up-and-down direction.

The base part 51*b* is a plate-like member, in which an opening part 511 is formed at almost the center thereof, and the upper surface is connected to a lower end part of the light pipe 21 and the cooling member 4*b* is attached to the lower surface so as to be movable in a horizontal direction. The opening part 511 is formed at a position that almost corresponds to the light pipe 21 and has almost the same shape as the cross-sectional shape of the light pipe 21. The side surface has a mirror surface formed by silver plating or the like as in the case of the inner surface of the light pipe 21 and the light box 22. As a result, the opening part 511 functions almost similarly as the light pipe 21, and allows light from the light source 23 to be uniformly irradiated on the upper surface of the stamper 3, whereby the surface to be irradiated can be uniformly heated.

It is preferred that the molding apparatus 1*b* have a cooling means to allow the cooling member 4*b* to be forcedly cooled. That is, in this embodiment, in the base part 51*b*, a channel 512 for flowing a coolant is formed in the vicinity of the peripheral part of the cooling member 4*b*. By allowing a coolant to flow in the channel 512, the cooling member 4*b* is forcedly cooled. Due to such a configuration, since temperature elevation in the cooling member 4*b* is suppressed, when the cooling member 4*b* is brought into contact with the stamper 3 that has been radiatingly heated, the stamper 3 can be cooled effectively.

The cooling member is not restricted to the above-mentioned configuration, and various cooling members can be used.

The holder 52*b* is a plate-like member to be attached to the lower surface of the base part 51*b*. In the upper surface thereof, a first concave part for accommodating the cooling member 4*b* so as to be movable in the horizontal direction is formed. Below this, a second concave part for accommodating for the stamper 3 so as to be movable in an up-and-down direction is formed. Below this, an opening part for allowing the shape-forming surface 31 of the stamper 3 is formed. When this holder 52*b* is attached to the base part 51*b*, the cooling member 4*b* is attached at a position corresponding to the light pipe 21 so as to be movable in the horizontal direction. The stamper 3 is attached to a position corresponding to the light pipe 21 and below the cooling member 4*b* so as to be movable in an up-and-down direction.

The side surface of the second concave part is a guide surface 522 that guides the movement of the stamper 3. By gravitation, a gap 521 is formed between the stamper that is supported in a stepped surface of the second concave part and the cooling member 4*b*.

The thickness of the gap 521 (distance in an up-and-down direction) is normally 0. several mm, but the thickness is not limited thereto.

The guide surface 522 functions as a guide means that guides the movement of the stamper 3. However, the guide means is not limited to the guide surface 522.

(Second Mold)

The second mold 6 is a plate-like member and supports the base 8 to which the structure of the shape-forming surface 31 of the stamper 3 is transferred. In this second mold 6, in its upper surface thereof, a convex part having a shape corresponding to the shape of the base 8 is formed, and in this convex part, the base 8 is mounted in the positioned state.

Although not shown, the first mold 5*b* and the second mold 6 are attached to a pressing machine (for example, a low-pressure pressing machine (pressing pressure: 1.0 MPa)). The second mold 6 is moved up and down, for example.

The structure in which the stamper 3 or the cooling member 4*b* are movably held are not particularly restricted, and various examples are possible.

One of these examples will be explained with reference to the drawings.

Figure 12A:
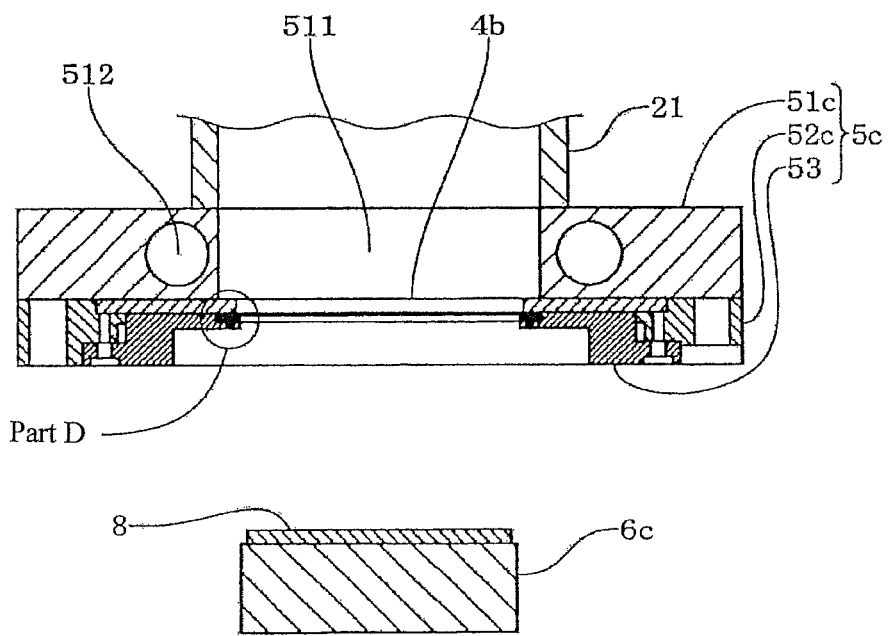
FIG. 12A is a schematic view cross-sectional view of essential parts for explaining the apparatus for molding a thermoplastic resin product according to the second example of the present invention.
Figure 12B:
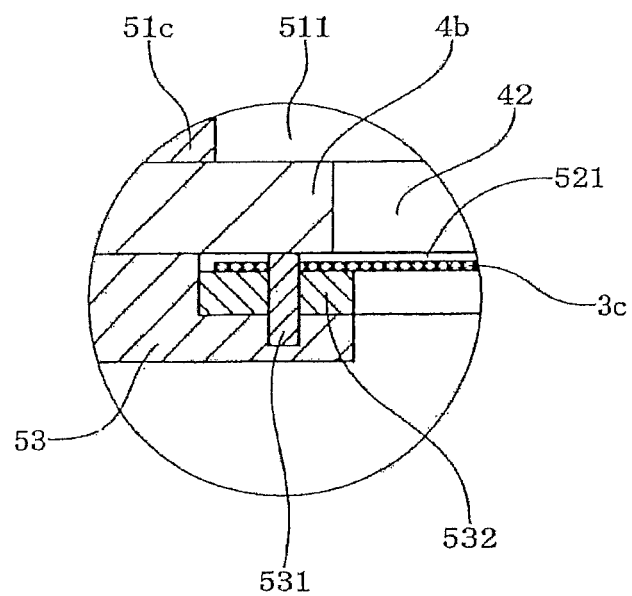
FIG. 12B is a schematic view of enlarged cross-sectional view of part D for explaining the apparatus for molding a thermoplastic resin product according to the second example of the present invention.

FIG. 12 is a schematic view for explaining the molding apparatus for molding a thermoplastic resin product according to the second example of the present invention, in which FIG. 12A is a cross-sectional view of essential parts and FIG. 12B is an enlarged cross-sectional view of part D.

In FIG. 12, the molding apparatus according to this example differs from the molding apparatus 1*b* in that it has a hook 53, a guide pin 531, a retainer 532 or the like. Other configurations of this example are almost the same as those of the above-mentioned molding apparatus 1*b*.

In FIG. 12, constituting elements which are similar to those in FIG. 11 are indicated by the same referential numerals, and a detailed explanation is omitted.

A first mold 5*c* is provided with a base part 51*c*, a holder 52*c*, the hook 53 or the like. The base part 51*c* differs from the above-mentioned base part 51*b* in that it has a channel 512 having a large channel area as compared with the above-mentioned base part 51*b*. Other configurations are almost the same as those of the base part 51*b*.

The holder 52*c* is a ring-like member in which a concave part for accommodating the peripheral part of the cooling member 4*b* is formed. Due to the attachment of the holder 52*c* to the base part 51*c*, the cooling member 4*b* is attached to the lower surface of the base part 511*c* so as to be movable in the horizontal direction.

As viewed from above, the hook 53 has an almost rectangular external shape, and a concave part for accommodating an end part of a stamper 3c is formed in the front end part thereof. By attachment of this hook 53 at four locations of the holder 52c, the stamper 3c is attached to a position that corresponds to the light pipe 21 and is below the cooling member 4b in a manner that it can be moved in an up-and-down direction. Due to such a configuration, unlike the case where the holder 52b of the above-mentioned second embodiment is brought into contact with the entire peripheral part of the stamper 3, and the entire peripheral part of the stamper 3 is cooled by thermal conductance, whereby uniform heating is adversely affected, the hook 53 is brought into contact with four locations of the peripheral part of the stamper 3c, and the entire peripheral part of the stamper 3c is not cooled by thermal conductance, a disadvantage that uniform heating is adversely affected can be eliminated.

It is preferred that the stamper 3c be held in the first mold 5c through a heat-insulating member. That is, in this application example, the ring-like retainer 532 made of polyether ketone, a fluorine resin, ceramic or the like as an insulating member is engaged with the concave part of the hook 53, and the stamper 3c is mounted on the upper surface of the retainer 532. Due to such a configuration, cooling of the peripheral part of the stamper 3c by thermal conductance can be suppressed, and hence, a disadvantage that uniform heating is adversely affected can be effectively suppressed. If heating is not conducted uniformly, in order to heat a part that has not been heated, a long heating time is taken, and in addition, a part is excessively heated, and, in order to cool this part, a long cooling time is taken in the cooling step, thus falling into a vicious cycle.

It is preferred that the movement of the stamper 3c be guided by a guide pin 531 as the guiding means. That is, in the first mold 5c, in the front end part of the hook 53, the guide pin 531 is vertically arranged. In the retainer 532 and the stamper 3c, a hole through which the guide pin 531 is inserted is formed. Due to such a configuration, the stamper 3c can move in an up-and-down direction smoothly, and, since it is engaged with the guide pin 531, a disadvantage that the stamper 3c is removed can be prevented without fail.

In this application example, the stamper 3c is remote from the retainer 532 and is moved upward. The configuration is, however, not limited thereto. For example, the stamper 3c and the retainer 532 are connected, and the thus connected stamper 3c and the retainer 532 are moved in an up-and-down direction. Due to such a configuration, even if the stamper 3c is large (for example, when it is of typing size or larger), the retainer 532 can reinforce the stamper 3c, whereby the durability of the stamper is improved.

As for the second mold 6c, the upper surface thereof is flat. Although not shown, a plurality of suction holes are formed on the upper surface, and the base 8 mounted in the positioned state is subjected to vacuum suction. Due to such a configuration, as almost in the same case as the second mold 6 in the above-mentioned embodiment, the second mold 6c can hold the base 8 at a prescribed position.

As almost in the same case of the first example, an opening part 42 is formed in the cooling member 4b.

Next, the operation of the molding apparatus 1b having the above-mentioned configuration and the second embodiment of the method for molding a thermoplastic resin product or the like will be explained with reference to the drawings.

FIG. 13 is a schematic cross-sectional view for explaining the method for molding a thermoplastic resin product according to the second embodiment of the present invention.

In FIG. 13, the method for molding a thermoplastic resin product according to this embodiment is a molding method in which compression molding is conducted for the base 8 by using the molding apparatus 1b. This method includes a heating step, a transfer step, a cooling step and a mold-releasing step.

In this embodiment, the material of the base 8 is a crystalline thermoplastic resin such as polyethylene terephthalate, but the material is not limited thereto. For example, the material of the base 8 may be polypropylene, polyethylene and nylon. Further, as the amorphous thermoplastic resin product, polystyrene, methyl polyacrylate and a cyclic olefin copolymer can be given. A crystalline thermoplastic resin is solidified when cooled, and an amorphous thermoplastic resin is hardened when cooled.

(Heating Step)

Figure 13A:
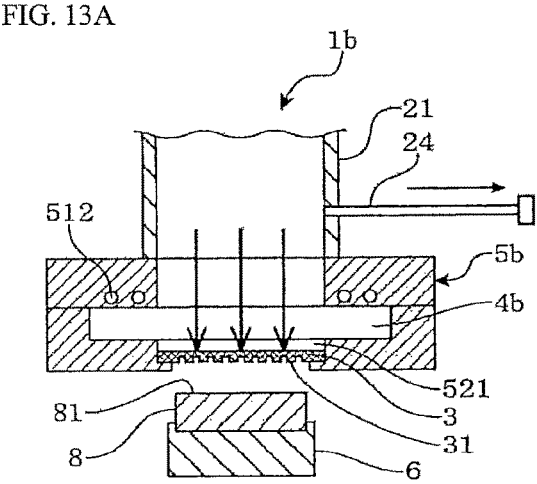
FIG. 13A is a schematic cross-sectional view for explaining the method for molding a thermoplastic resin product according to the second embodiment of the present invention.

In the heating step, in the molding apparatus 1b, as shown in FIG. 13A, the shutter 24 is opened, the second mold 6 is positioned below the first mold 5b. The stamper 3 is irradiated with infrared rays emitted from the heating apparatus 2, whereby the stamper 3 is radiatingly heated.

In this heating step, in almost the same manner as in the above-mentioned first embodiment, the cooling member 4b is retreated from the irradiation path of infrared rays, and the stamper 3 is irradiated with infrared rays in the state where the cooling member 4b is not irradiated with infrared rays. Other operations of the heating step are almost the same as those in the first embodiment, and almost similar effects as those attained by the above-mentioned embodiment can be attained.

(Transfer Step)

Figure 13B:
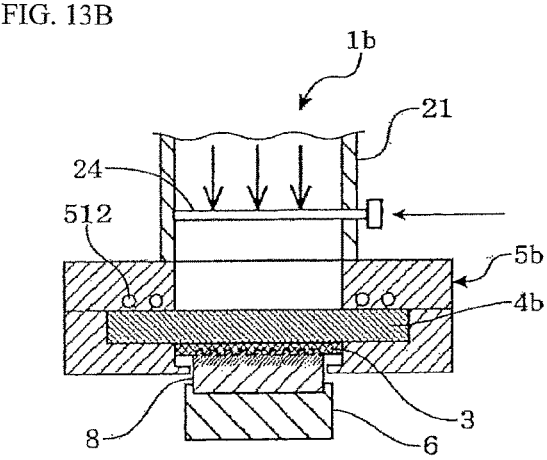
FIG. 13B is a schematic cross-sectional view for explaining the method for molding a thermoplastic resin product according to the second embodiment of the present invention.

Next, in the transfer step, as shown in FIG. 13B, in the molding apparatus 1b, the structure of the shape-forming surface 31 of the stamper 3 that has been radiatingly heated is transferred to the transfer surface 81 of the base 8. That is, in this transfer step, the shutter 24 is closed, and the cooling member 4b enters the irradiation path of infrared rays, the second mold 6 is moved upward and the transfer surface 81 of the base 8 is brought into contact with the shape-forming surface 31 of the stamper 3. Then, the stamper 3 is moved upward as it is pushed up, and the transfer surface 81 is pressed against the shape-forming surface 31 in the state where the stamper 3 is in contact with the cooling member 4b, whereby the structure of the shape-forming surface 31 is transferred to the transfer surface 81 of the base 8.

In this embodiment, from immediately after the start of the transfer step to the completion of the transfer step, the stamper 3 is in contact with the cooling member 4b that has advanced to the irradiation path of infrared rays. That is, in almost all stages of the transfer step, as shown in FIG. 13B, the stamper 3 is in contact with the cooling member 4, and the cooling member 4 reinforces the stamper 3.

Due to such a configuration, even when the thickness of the stamper 3 is several hundreds μm and the mechanical strength thereof is low, in the transfer step, the cooling member 4b is in contact with the stamper 3 and transfer is completed in the state where the stamper 3 is reinforced by the cooling member 4b, a disadvantage that transfer is completed in the state where the stamper 3 is deformed by curvature, deflection or the like can be prevented, whereby transfer accuracy and the like can be improved.

In addition, since the cooling member 4b functions as the reinforcing member of the stamper 3 in the transfer step, the thickness of the stamper 3 can be rendered small, whereby the heating time and the cooling time can be shortened.

(Cooling Step)

Figure 13C:
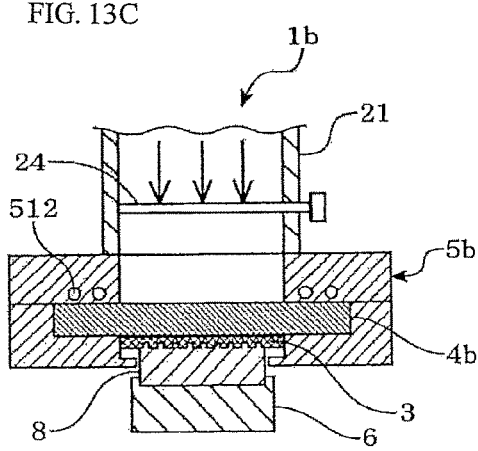
FIG. 13C is a schematic cross-sectional view for explaining the method for molding a thermoplastic resin product according to the second embodiment of the present invention.

Subsequently, in the cooling step, as shown in FIG. 13C, in the molding apparatus 1b, the stamper 3 is brought into contact with the cooling member 4, and the base 8 is cooled through the stamper 3, thereby to solidify or harden the base 8. That is, transfer is completed when the stamper 3 is brought into contact with the cooling member 4b and the base 8 is pressed against the stamper 3 in this state. Further, when the stamper 3 is brought into contact with the cooling member 4b, the stamper 3 is cooled by thermal conductance to the cooling member 4b, and the base 8 is cooled by thermal conductance to the stamper 3.

In this embodiment, transfer starts when the base 8 is brought into contact with the stamper 3, and cooling of the stamper 3 starts immediately after the start of the transfer.

(Mold-releasing Step)

Figure 13D:
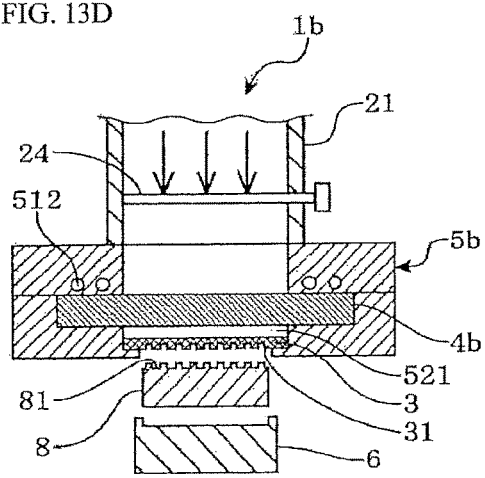
FIG. 13D is a schematic cross-sectional view for explaining the method for molding a thermoplastic resin product according to the second embodiment of the present invention.

Subsequently, in the molding apparatus 1b, as shown in FIG. 13D, by releasing the state where the shape-forming surface 31 is pressed against the transfer surface 81, the molded product is released from the mold. That is, in this mold-releasing step, the second mold 6 is lowered, and the stamper 3 is separated from the cooling member 4b and is moved downward. Then, the transfer surface 81 is separated from the shape-forming surface 31, and the second mold 6 is lowered to the original position (a position below the first mold 5b). Thereafter, the base 8 is transported, whereby one cycle of molding is completed.

As explained hereinabove, according to the molding apparatus 1b and the method for molding according to this embodiment, since the stamper 3 is radiatingly heated in the heating step in the state where the cooling member 4b is not irradiated with infrared rays emitted from the heating apparatus 2, it is possible to use the cooling member 4b that is cooler since it is not heated by infrared rays can be used. As a result, the cooling time can be shortened, whereby productivity can be significantly improved.

Further, even when the stamper 3 is deformed from the flat state by curvature, deflection or the like, it is possible to suppress deformation of the stamper 3, to enable transfer to be conducted in the flat state, whereby the transfer quality can be improved.

Although not shown, the heating time can be shortened in the heating step by pre-heating the transfer surface 81 of the base 8.

[Third Embodiment of the Apparatus for Molding a Thermoplastic Resin Product and the Method for Molding]

FIG. 14 is a schematic cross-sectional view of the apparatus for molding a thermoplastic resin product and the method for molding a thermoplastic resin product according to the third embodiment of the present invention.

In FIG. 14, a molding apparatus 1d of this embodiment differs from the molding apparatus 1b of the above-mentioned second embodiment in that a stamper 3d is thick. Other configurations of the molding apparatus 1b are almost the same as those of the above-mentioned molding apparatus 1b.

In FIG. 14, constituting elements which are similar to those in FIG. 11 are indicated by the same referential numerals, and a detailed explanation is omitted.

(Stamper)

The stamper 3d differs from the above-mentioned stamper 3 of the second embodiment in that it has a thickness of 1. several mm to several mm. Other configurations of the stamper 3d are almost the same as those of the stamper 3. This stamper 3d, when radiatingly heated in the heating step, can have a heat capacitance larger than that of the stamper 3. Therefore, even if it is not radiatingly heated in the transfer step, by using the heat stored by the stamper 3d in the heating step, the structure of the shape-forming surface 31 of the stamper can be transferred to the transfer surface 81 of the base 8.

Next, the operations of the molding apparatus 1d having the above-mentioned configuration, the third embodiment of the method for molding a thermoplastic resin product or the like will be explained with reference to the drawings.

In FIG. 14, the method for molding a thermoplastic resin product according to this embodiment is a molding method in which compression molding is conducted for the base 8 by using the molding apparatus 1d. This method includes a heating step, a transfer step, a cooling step and a mold-releasing step.

(Heating Step)

Figure 14A:
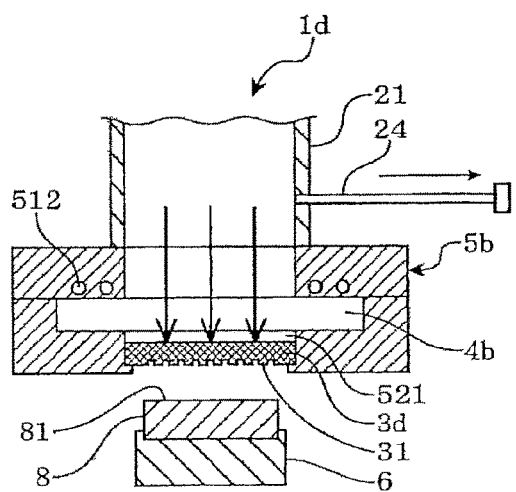
FIG. 14A is a schematic cross-sectional view of the apparatus for molding a thermoplastic resin product and the method for molding a thermoplastic resin product according to the third embodiment of the present invention.

In the heating step, in the molding apparatus 1d, as shown in FIG. 14A, the shutter 24 is opened, a stamper 3d that is released from the cooling member 4b is irradiated with infrared rays emitted from the heating apparatus 2, whereby the stamper 3d is radiatingly heated (heating step).

By this, since stamper 3d can have a heat capacitance larger than that of the stamper 3, it is not required to radiatingly heat the stamper 3d in the transfer step, as in the case of the above-mentioned first application example.

(Transfer Step)

Figure 14B:
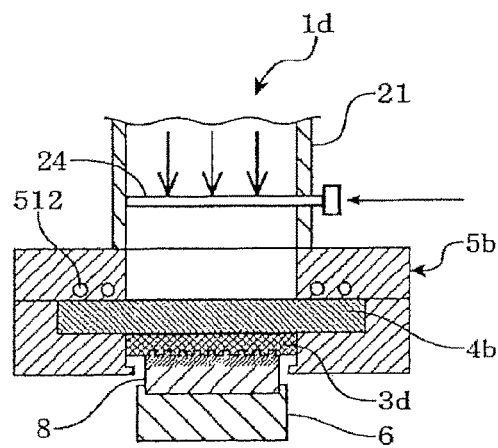
FIG. 14B is a schematic cross-sectional view of the apparatus for molding a thermoplastic resin product and the method for molding a thermoplastic resin product according to the third embodiment of the present invention.

Next, in the transfer step, as shown in FIG. 14B, in the molding apparatus 1d, the structure of the shape-forming surface 31 of the stamper 3d that has been radiatingly heated is transferred to the transfer surface 81 of the base 8 (transfer step). That is, in this transfer step, the shutter 24 is closed, and the cooling member 4b enters the irradiation path of infrared rays, the second mold 6 is lifted up and the transfer surface 81 of the base 8 is brought into contact with the shape-forming surface 31 of the stamper 3d. Then, the stamper 3d is moved upward as it is pushed up, and the transfer surface 81 is pressed against the shape-forming surface 31 in the state where the stamper 3d is in contact with the cooling member 4b, whereby the structure of the shape-forming surface 31 is transferred to the transfer surface 81 of the base 8 by using only the heat stored by the stamper 3d.

It is preferred that, when the second mold 6 is lifted up, in the state where the transfer surface 81 of the base 8 is in contact with the shape-forming surface 31 and the stamper 3d is not in contact with the cooling member 4b, the upward movement be stopped and the transfer surface 81 be pre-heated by the heat of the stamper 3d. Thereafter, by further upward movement, the structure of the shape-forming surface 31 may be transferred to the transfer surface 81 of the base 8. By this, the heat of the stamper 3d can be effectively utilized.

(Cooling Step)

Figure 14C:
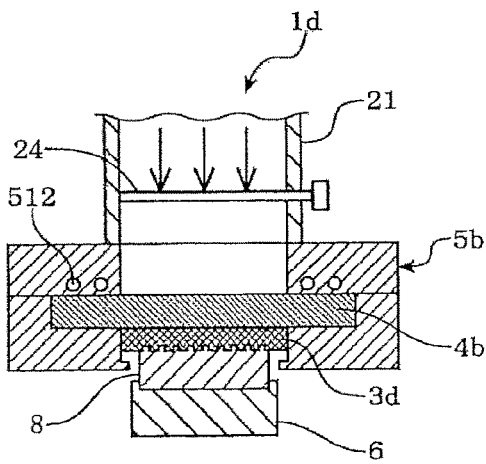
FIG. 14C is a schematic cross-sectional view of the apparatus for molding a thermoplastic resin product and the method for molding a thermoplastic resin product according to the third embodiment of the present invention.

Subsequently, in the molding apparatus 1d, as shown in FIG. 14C, in the state where the shape-forming surface 31 is pressed against the transfer surface 81, the cooling member 4b that is in contact with the stamper 3d cools the stamper 3d, thereby to solidify or harden the base 8 (cooling step). That is, in this embodiment, in the transfer step, cooling starts when the stamper 3d is brought into contact with the cooling member 4b. Therefore, in the transfer step and the cooling step of this embodiment, transfer starts when the transfer surface 81 is brought into contact with the shape-forming surface 31, cooling starts when the stamper 3d is brought into contact with the cooling member 4b, and cooling is completed after the completion of transfer.

(Mold-releasing Step)

Figure 14D:
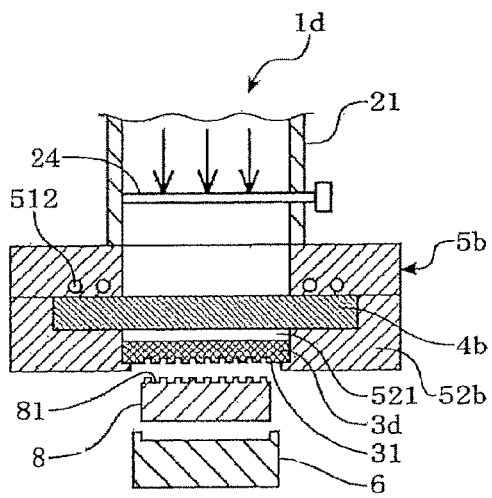
FIG. 14D is a schematic cross-sectional view of the apparatus for molding a thermoplastic resin product and the method for molding a thermoplastic resin product according to the third embodiment of the present invention.

Subsequently, in the molding apparatus 1d, as shown in FIG. 14D, by releasing the state where the shape-forming surface 31 is pressed against the transfer surface 81, the molded product is released from the mold (mold-releasing step). That is, in this mold-releasing step, the second mold 6 is lowered, and the stamper 3d is separated from the cooling member 4b and is moved downward. Then, when the stamper 3d is engaged with the holder 52b, the transfer surface 81 is separated from the shape-forming surface 31, and the second mold 6 is lowered to the original position. Thereafter, the base 8 is transported, whereby one cycle of molding is completed.

As explained above, according the method for molding and the molding apparatus 1d according to this embodiment, not only almost similar effects as those attained by the molding apparatus 1b of the second embodiment an be attained, but also, since the stamper 3d can have a heat capacitance larger than that of the stamper 3, insufficient transfer due to insufficient heat capacitance can be effectively prevented.

[Fourth Embodiment of the Apparatus for Molding a Thermoplastic Resin Product and the Method for Molding]

FIG. 15 is a schematic cross-sectional view for explaining the apparatus for molding a thermoplastic resin product and the method for molding a thermoplastic resin product according to the fourth embodiment of the present invention.

In FIG. 15, a molding apparatus 1e of this embodiment differs from the molding apparatus 1d of the above-mentioned third embodiment in that it is provided with a plurality of engagement pins 523 that is engaged with the stamper 3d so that the stamper is not moved upward and, in the transfer step excluding the final stage of the transfer, transfer is conducted by the stamper 3d that is held in the state where it is remote from the cooling member 4d or the like.

Other configurations of this embodiment are almost the same as those of the above-mentioned molding apparatus 1d.

In FIG. 15, constituting elements which are similar to those in FIG. 14 are indicated by the same referential numerals, and a detailed explanation is omitted.

As mentioned above, since the stamper 3d has a thickness of 1. several mm to several mm and has a large mechanical strength, even if transfer is conducted in the state where the edge part is engaged with the engagement pin 523 instead of being brought into contact with the cooling member 4b, a disadvantage that the stamper 3d is deformed can be prevented, and transfer accuracy or the like are not lowered.

In this embodiment, the stamper 3d is held in the state where it is remote from the cooling member 4b by the engagement pin 523 and the second mold 6.

(Engagement Pin)

The engagement pin 523 is embedded in a holder 52e so as to be moved reciprocally. The engagement pin 523 engages the stamper 3d that is lifted up when the front end part is protruded to a gap 521e by an air cylinder or the like.

The holder 52e has a shape that the thickness of the gap 521e (distance in an up-and-down direction) is several mm, and other configurations are almost the same as those of the holder 52b.

Next, the operation of the molding apparatus 1e having the above-mentioned configuration and the fourth embodiment of the method for molding a thermoplastic resin product or the like will be explained with reference to the drawings.

In FIG. 15, the method for molding a thermoplastic resin product of this embodiment is a method for molding in which compression molding is conducted for the base 8 by using the molding apparatus 1e, and includes a heating step, a transfer step, a cooling step and a mold-releasing step.

(Heating Step)

Figure 15A:
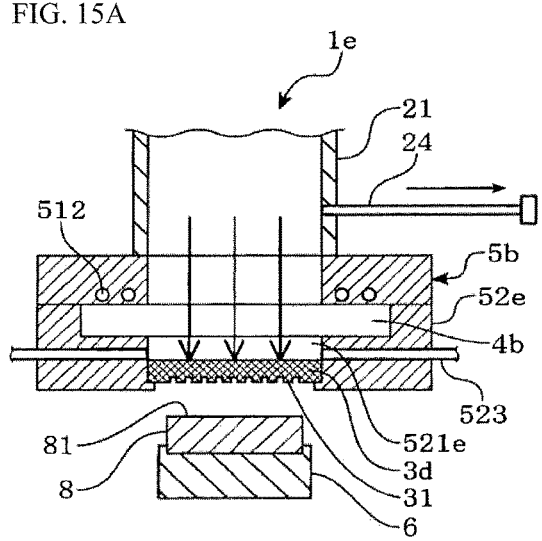
FIG. 15A is a schematic cross-sectional view for explaining the apparatus for molding a thermoplastic resin product and the method for molding a thermoplastic resin product according to the fourth embodiment of the present invention.

In a molding apparatus 1e, as shown in FIG. 15A, the shutter 24 is opened, the stamper 3d that is separated from the cooling member 4b is radiatingly heated to a temperature that is high enough to eliminate the need of conducting radiation heating in the transfer step (heating step). By this, almost similar effects as those attained by the third embodiment can be attained.

In the engagement pin 523, the end surface is at a position corresponding to the inner surface of the gap 521e, and does not adversely affect uniform irradiation of infrared rays.

The cooling member 4b is retreated from the irradiation path, and hence is in the state where it is remote from the stamper 3d.

(Transfer Step)

Figure 15B:
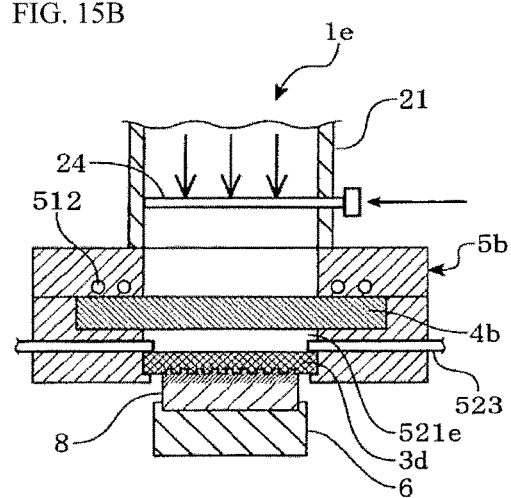
FIG. 15B is a schematic cross-sectional view for explaining the apparatus for molding a thermoplastic resin product and the method for molding a thermoplastic resin product according to the fourth embodiment of the present invention.

Subsequently, in the molding apparatus 1e, as shown in FIG. 15B, the structure of the shape-forming surface 31 of the stamper 3d that has been radiatingly heated is transferred to the transfer surface 81 of the base 8 (transfer step). That is, in this transfer step, when the shutter 24 is closed, the cooling member 4b enters the irradiation path, the front end of the engagement pin 523 is projected to the gap 521e, the second mold 6 is lifted up, the transfer surface 81 of the base 8 is brought into contact with the shape-forming surface 31 of the stamper 3d, and subsequently, the stamper 3d is moved upward as it is lifted up (normally, the distance of this movement is very small), and the stamper 3d is engaged by the engagement pin 523, the stamper 3d is held in the state where it is remote from the cooling member 4. In this state, the transfer surface 81 is pressed against the shape-forming surface 31, whereby the structure of the shape-forming surface 31 is transferred to the transfer surface 81 of the base 8.

This embodiment differs from the third embodiment in that, in the transfer step excluding the final stage of the transfer, since the stamper 3d is not in contact with the cooling member 4b, the temperature of the stamper 3d is stabilized, whereby transfer can be conducted more surely.

In this embodiment, the stamper 3d is not radiatingly heated in the transfer step, the timing of the radiation heating is not restricted thereto. For example, the stamper 3d may be radiatingly heated as in the case of the first application example mentioned above.

In this embodiment, in the final stage of the transfer step, the stamper 3d is in contact with the cooling member 4b.

(Cooling Step)

Figure 15C:
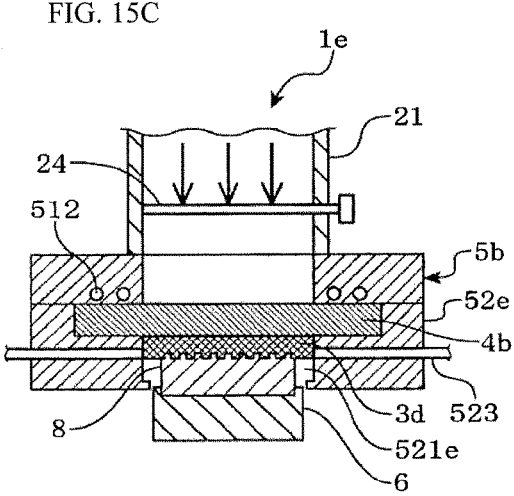
FIG. 15C is a schematic cross-sectional view for explaining the apparatus for molding a thermoplastic resin product and the method for molding a thermoplastic resin product according to the fourth embodiment of the present invention.

Subsequently, in the molding apparatus 1e, as shown in FIG. 15C, in the state where the shape-forming surface 31 is pressed against the transfer surface 81, the cooling member 4b that is in contact with the stamper 3d cools the stamper 3d, thereby to solidify or harden the base 8 (cooling step). That is, in this embodiment, in the engagement pin 523, the end surface returns to a position where it corresponds to the inner surface of the gap 521e, the second mold 6 is lifted up, the stamper 3d is moved upward as it is pushed up, the stamper 3d is brought into contact with the cooling member 4b, whereby the stamper 3d is cooled.

Here, the cooling member 4b is not in contact with the stamper 3d in the transfer step excluding the final stage, temperature elevation can be effectively suppressed, whereby the cooling time can be shortened.

(Mold-releasing Step)

Figure 15D:
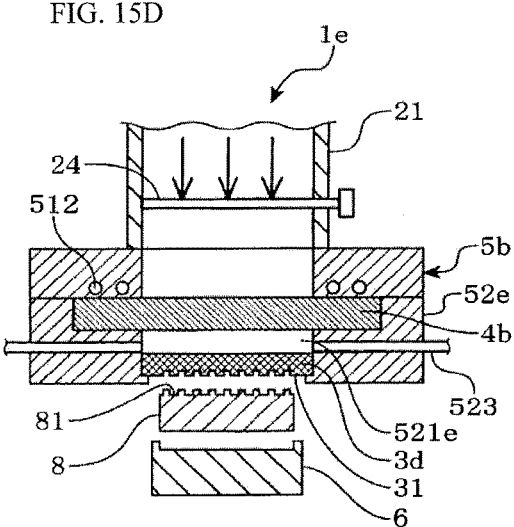
FIG. 15D is a schematic cross-sectional view for explaining the apparatus for molding a thermoplastic resin product and the method for molding a thermoplastic resin product according to the fourth embodiment of the present invention.

Subsequently, in a molding apparatus 1e, as shown in FIG. 15D, by releasing the state where the shape-forming surface 31 is pressed against the transfer surface 81, the molded product is removed from the mold (mold-releasing step). That is, in this mold-releasing step, the second mold 6 is lowered, and the stamper 3d is separated from the cooling member 4b and is moved downward. Then, when the stamper 3d is engaged with the holder 52e, the transfer surface 81 is separated from the shape-forming surface 31, and the second mold 6 is lowered to the original position. Thereafter, the base 8 is transported, whereby one cycle of molding is completed.

As explained hereinabove, according the molding apparatus 1e of this embodiment, not only almost similar effects as those attained by the molding apparatus 1d of the third embodiment are attained, but also the cooling member 4d is not in contact with the stamper 3d in the transfer step excluding the final stage, the temperature of the stamper 3d is stabilized, whereby the transfer can be conducted more surely. In addition, only a small amount of heat is stored in the stamper 3d, the heating time can be shortened.

This embodiment can also be applied to the above-mentioned embodiment.

[Five Embodiment of the Apparatus for Molding a Thermoplastic Resin Product and the Method for Molding]

Figure 16:
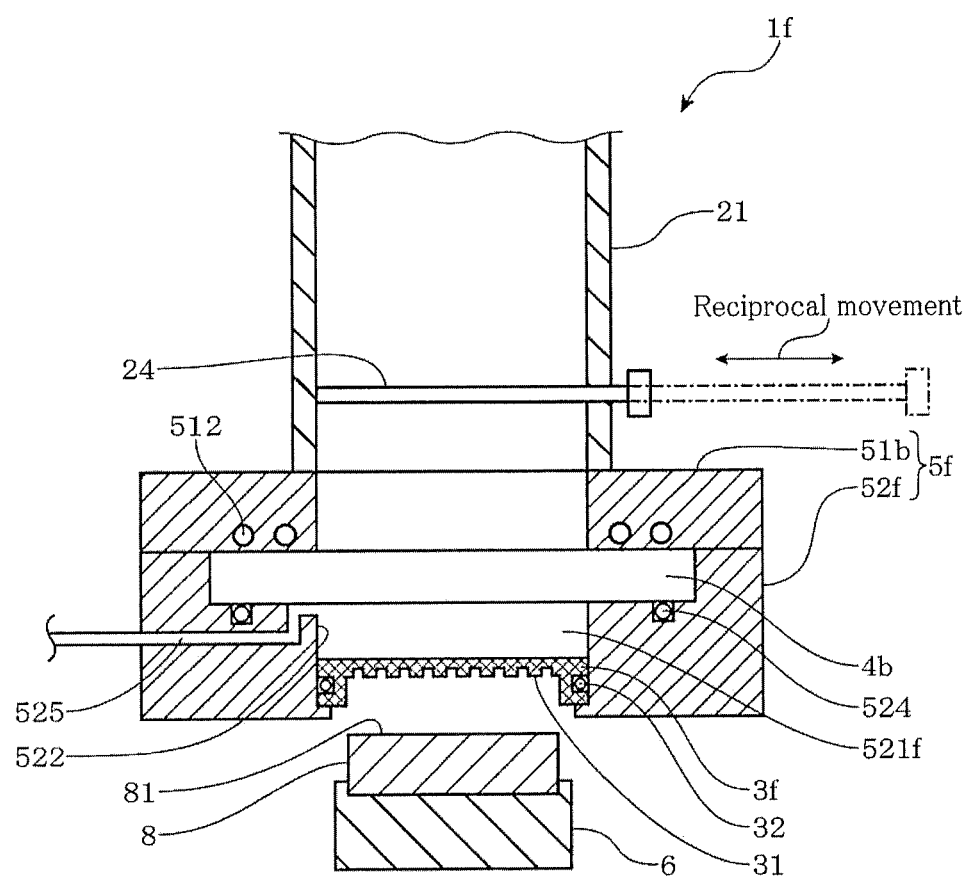
FIG. 16 is a schematic enlarged cross-sectional view of essential parts for explaining the apparatus for molding a thermoplastic resin product according to the fifth embodiment of the present invention.

FIG. 16 is a schematic enlarged cross-sectional view of essential parts for explaining the apparatus for molding a thermoplastic resin product according to the fifth embodiment of the present invention.

In FIG. 16, a molding apparatus 1f differs from the molding apparatus 1b in the above-mentioned second embodiment in that, in the transfer step, by applying a pressure to the gap 521f between the cooling member 4b and the stamper 3f, the stamper 3f is held in the state where it is remote from the cooling member 4b, and transfer is conducted by the stamper 3f. Other configurations or the like of this embodiment are almost the same as those of the molding apparatus 1b.

Accordingly, in FIG. 16, constituting elements which are almost similar to those in FIG. 11 are indicated by the same referential numerals, and a detailed explanation is omitted.
(Stamper)

The stamper 3f of this embodiment differs from the stamper 3 of the second embodiment in that a ring-like part in which an O-ring groove for accommodating an O-ring 32 is provided. Other configurations of the stamper 3f are almost the same as those of the stamper 3.

Due to such a configuration, in the stamper 3f, a lower space in which the second mold 6 is positioned and the gap 521f between the cooling member 4b and a stamper 3f is sealed, whereby the pressure in the gap 521f can be higher than the pressure in the above-mentioned lower space. The stamper 3f can be moved in an up-and-down direction along the guide surface 522 in the sealed state.

The above-mentioned ring-like part is normally formed integrally with the plate-like part of the stamper 3f (mainly, the plate-like part means a part that is nearer to the center than the peripheral part). The shape of the ring-like part is not limited thereto, and may have a structure in which a ring-like member made of a material having excellent heat insulating properties is connected to the plate-like part.
(First Mold)

A first mold 5f differs from the first mold 5b in the second embodiment in that a pressure control channel 525 and an O-ring 524 are provided in the holder 52f, and other configurations of the first mold 5f are almost the same as those of the first mold 5b.

In the holder 52f, in order to control the pressure in the gap 521f, the pressure control channel 525 is provided. Although not shown, this pressure control channel 525 is intercommunicated with a pressure source such as an industrial air and open air for opening part atmospheric pressure through a conduit, a valve or the like. In the holder 52f, an O-ring groove for accommodating the O-ring 524 is formed at a surface where the cooling member 4b is mounted. An upper part of the gap 521f is sealed by the O-ring 524.

The thickness (the distance in an up-and-down direction) of the gap 521f is normally several mm.

Subsequently, the operation of the molding apparatus 1f having the above-mentioned configuration and the fifth embodiment of the method for molding a thermoplastic resin product will be explained.

FIG. 17 is a schematic cross-sectional view for explaining the method for molding a thermoplastic resin product according to the fifth embodiment of the present invention.

In FIG. 17, the method for molding a thermoplastic resin product of this embodiment is a method for molding in which compression pressing is conducted for the base 8 by using the molding apparatus 1f, and includes a heating step, a transfer step, a cooling step and a mold-releasing step.
(Heating Step)

Figure 17A:
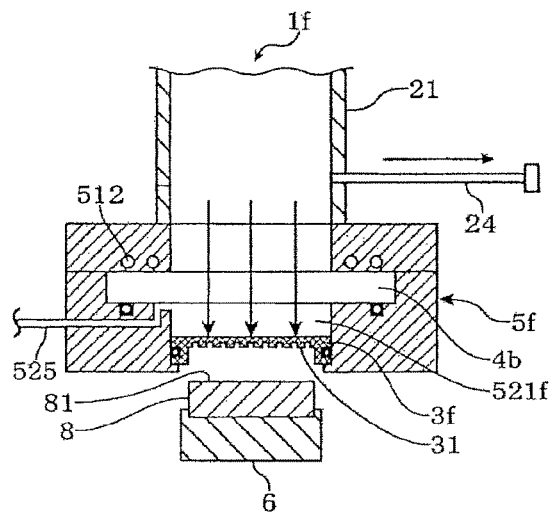
FIG. 17A is a schematic cross-sectional view for explaining the method for molding a thermoplastic resin product according to the fifth embodiment of the present invention.

In the molding apparatus 1f, that is in the state shown in FIG. 16, i.e. the state in which pressure in the gap 521f is exposed to atmosphere, the shutter 24 is opened as shown in FIG. 17A. Infrared rays emitted from the heating apparatus 2 radiantly heats the stamper 3f that is remote from the cooling member 4b with infrared rays emitted from the heating apparatus 2 (heating step).

In this way, as almost in the same way as in the second embodiment, by radiatingly heating the stamper 3f that is remote from the cooling member 4b, thermal conductance from the stamper 3f to the cooling member 4b is not conducted, whereby the stamper 3f can be heated effectively, and as a result, the heating time can be shortened.
(Transfer Step)

Figure 17C:
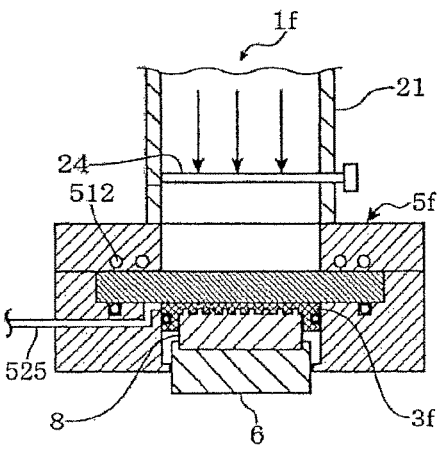
FIG. 17C is a schematic cross-sectional view for explaining the method for molding a thermoplastic resin product according to the fifth embodiment of the present invention.
Figure 17B:
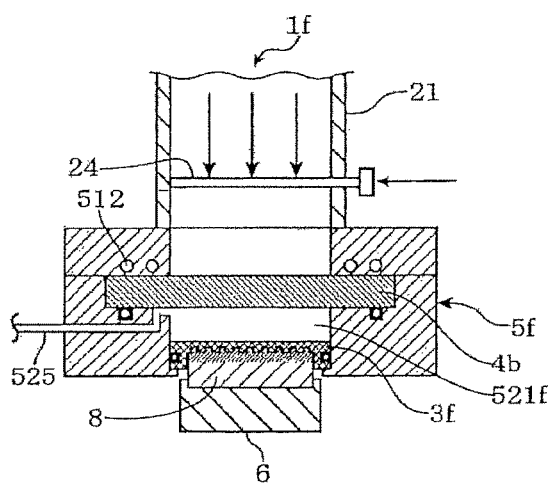
FIG. 17B is a schematic cross-sectional view for explaining the method for molding a thermoplastic resin product according to the fifth embodiment of the present invention.

Subsequently, in the molding apparatus 1f, as shown in FIG. 17B, the structure of the shape-forming surface 31 of the stamper 3f that has been radiatingly heated is transferred to the transfer surface 81 of the base 8 (transfer step). That is, in this transfer step, the shutter 24 is closed, the cooling member 4b enters the irradiation path of infrared rays, the second mold 6 is lifted up as clamping, and the transfer surface 81 of the base 8 is brought into contact with the shape-forming surface 31 of the stamper 3f.

At this time, in the molding apparatus 1f, simultaneously with, immediately before or immediately after the contact of the transfer surface 81 of the base 8 with the shape-forming surface 31 of the stamper 3f, a fluid such as industrial air is supplied to the gap 521f through the pressure control channel 525. As a result, in the gap 521f between the cooling member 4b and the stamper 3f, a pressure higher than the atmospheric pressure is applied, and the stamper 3f is held in the state where it is remote from the cooling member 4b. In this state, the transfer surface 81 is pressed against the shape-forming surface 31, and the structure of the shape-forming surface 31 is transferred to the transfer surface 81 of the base 8.

In this embodiment, the thickness of the stamper 3f has a thickness of several hundreds μm. Although the mechanical strength is low, since the transfer surface 81 is pressed against the shape-forming surface 31 almost uniformly by the pressure inside the gap 521*f*, a disadvantage that the stamper 3*f* is deformed can be prevented, whereby transfer accuracy or the like can be improved.

In this embodiment, a pressure higher than atmospheric pressure is applied to the gap 521*f*. The pressure in the gap 521*f* may be a pressure that is higher than the pressure of the lower space in which the second mold 6 is positioned, the stamper 3*f* is held in the state where it is remote from the cooling member 4*b*, and the transfer surface 81 may be pressed against the shape-forming surface 31 almost uniformly by the pressure in the gap 521*f*. Therefore, the pressure to be applied to the gap 521*f* is not limited to a pressure higher than the atmospheric pressure. For example, when the lower space in which the second mold 6 is vacuumed, it may be atmospheric pressure or a pressure lower than atmospheric pressure.

After applying a pressure higher than atmospheric pressure to the gap 521*f*, and then a valve (not shown) connected to the pressure control channel 525 is closed, thereby allowing the gap 521*f* to be a sealed space. In this case, in accordance with a thrust of the pressing machine that has been set to a predetermined value, the stamper 3*f* is lifted up, and a force generated by the pressure inside the gap 521*f* is balanced with the thrust of the pressing machine, the stamper 3*f* is stopped.

(Cooling Step)

Subsequently, in the molding apparatus 1*f*, as shown in FIG. 17C, in the state where the shape-forming surface 31 is pressed against the transfer surface 81, the cooling member 4*b* that is in contact with the stamper 3*f* cools the stamper 3*f*, thereby to solidify or harden the base 8 (cooling step). That is, in this embodiment, the pressure in the gap 521*f* is exposed to air, the second mold 6 is lifted up, the stamper 3*f* is brought into contact with the cooling member 4*b*, whereby the stamper 3*f* is cooled.

As almost in the case of the above-mentioned fourth embodiment, the cooling member 4*b* is not in contact with the stamper 3*f* in the transfer step excluding the final stage of the transfer, temperature elevation is effectively suppressed, whereby the cooling time can be shortened.

Cooling after the transfer can be effectively conducted by the cooling member 4*b* of which an increase in temperature has been suppressed, occurrence of poor appearance of the molded product (for example, a protruded part, or the like) can be prevented, whereby quality can be improved.

(Mold-releasing Step)

Figure 17D:
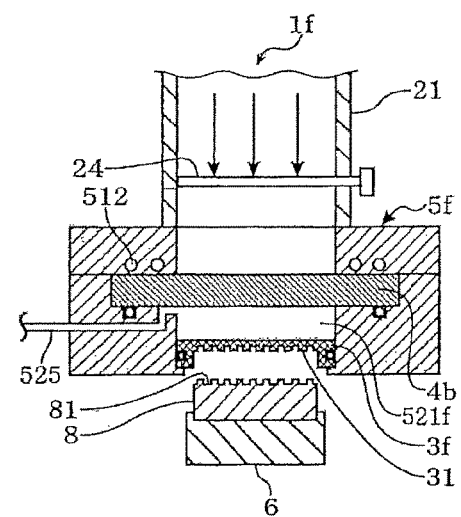
FIG. 17D is a schematic cross-sectional view for explaining the method for molding a thermoplastic resin product according to the fifth embodiment of the present invention.

Subsequently, in the molding apparatus 1*f*, as shown in FIG. 17D, by releasing the state where the shape-forming surface 31 is pressed against the transfer surface 81, the molded product is released from the mold (mold-releasing step). That is, in this mold-releasing step, the second mold 6 is lowered, and the stamper 3*f* is separated from the cooling member 4*b* and is moved downward. Then, the transfer surface 81 is separated from the shape-forming surface 31, and the second mold 6 is lowered to the original position. Thereafter, the base 8 is transported, whereby one cycle of molding is completed.

As explained above, according the molding apparatus 1*f* of this embodiment, not only almost similar effects as those attained by the molding apparatus 1*b* of the second embodiment are attained, but also the stamper 3*f* is in the state where it is remote from the cooling member 4*b* in the transfer step excluding the final stage, the temperature of the stamper 3*f* is prevented from being deprived by the cooling member 4*b*, whereby the heating time, the transfer time and the cooling time can be shortened.

This embodiment can also be applied to the above-mentioned embodiment.

[Sixth Embodiment of the Apparatus for Molding a Thermoplastic Resin Product and the Method for Molding]

Figure 18:
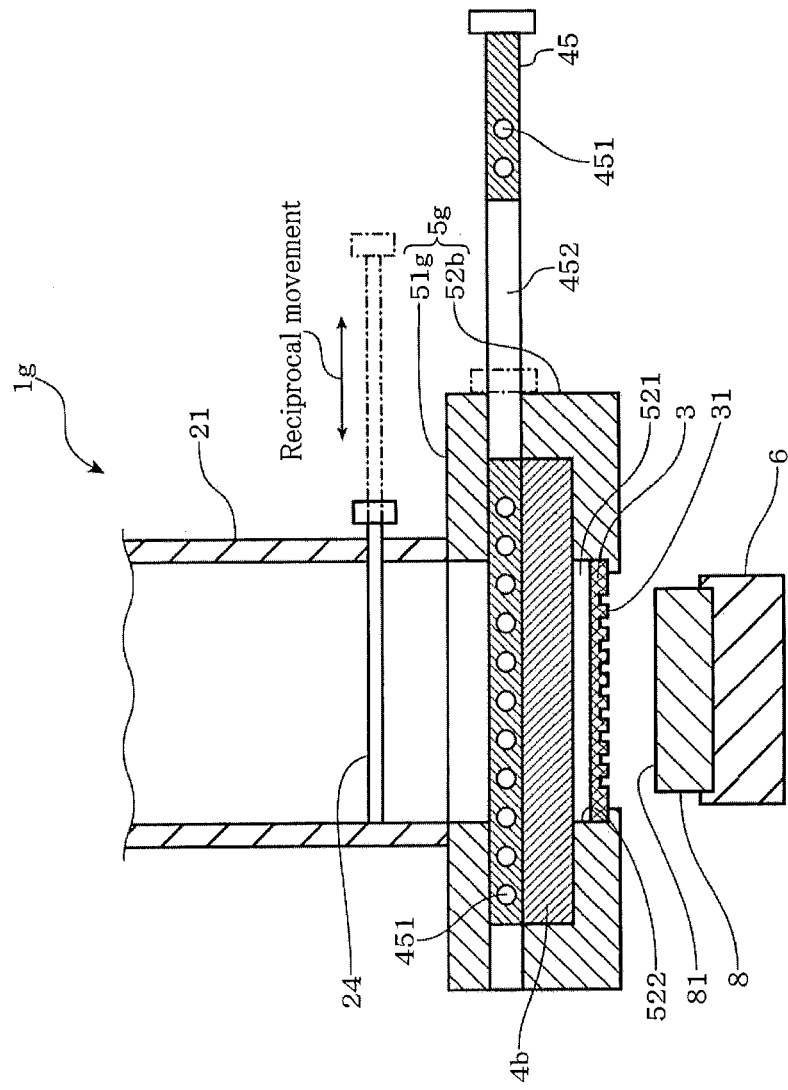
FIG. 18 is an enlarged schematic cross-sectional view of essential parts for explaining an apparatus for molding a thermoplastic resin product according to the sixth embodiment of the present invention.

FIG. 18 is an enlarged schematic cross-sectional view of essential parts for explaining an apparatus for molding a thermoplastic resin product according to the sixth embodiment of the present invention.

In FIG. 18, the molding apparatus 1*g* of this embodiment differs from the molding apparatus 1*b* of the above-mentioned second embodiment in that it is provided with the forced cooling plate 45 that forcedly cools the cooling member 4*b*. Other configurations or the like of this embodiment are almost the same as those of the molding apparatus 1*b*.

In FIG. 18, constituting elements which are similar to those in FIG. 11 are indicated by the same referential numerals, and a detailed explanation is omitted.

(First Mold)

A first mold 5*g* differs from the first mold 5*b* of the second embodiment in that, a concave part is formed in the base part 51*g*, and a forcedly cooling plate 45 (mentioned later) is movably provided in this concave part. Other configurations of the first mold 5*g* are almost the same as those of the first mold 5*b*.

(Forcedly Cooling Plate)

The forcedly cooling plate 45 is made of a material having excellent heat conductivity such as aluminum and copper. It has a rectangular flat shape so as to be able to cover the cooling member 4*b* and is provided in the concave part of the base part 51*g* in such a manner that it can be moved in the horizontal direction. In the forcedly cooling plate 45, at almost the central part thereof, an opening part 452 having almost the same shape as the cross sectional shape of the light pipe 21 is provided. On the both sides of the opening part 452 (on the left side and the right side of the opening part 452 in FIG. 18), a channel 451 for flowing a coolant is formed.

The side surface of the opening part 452 is a mirror surface. When the opening part 452 is moved to a position corresponding to the light pipe 21 in the heating step and the transfer step, the opening part 452 functions almost similarly as that of the light pipe 21. Therefore, the upper surface of the stamper 3 is uniformly irradiated with light emitted from the light source 23, whereby the stamper 3 can be uniformly heated.

As for a part on the left side of the opening part 452 in which the channel 451 is provided, when this part is moved to a position at which it covers the cooling member 4*b* in the cooling step and the mold-releasing step, it contacts the entire upper surface of the cooling member 4*b*, cooling can be conducted efficiently while keeping the temperature distribution of the cooling member 4*b* almost uniformly.

In this embodiment, only one forcedly cooling plate 45 is used. The configuration is not limited thereto. For example, a plurality of forcedly cooling plate 45 are prepared, and the forcedly cooling plate 45 that has been fully cooled may be used in sequence. Due to such a configuration, even if molding is conducted continuously, effective cooling can be conducted without fail.

Further, since the forcedly cooling plate 45 shields light emitted from the light source 23, and hence it has a function as the shutter 24. Therefore, this plate may be used instead of the shutter 24.

Subsequently, the operation of a molding apparatus 1*g* having the above-mentioned configuration and the sixed embodiment of the method for molding a thermoplastic resin product or the like will be explained with reference to the drawings.

FIG. 19 is a schematic cross-sectional view for explaining the method for molding a thermoplastic resin product according to the sixth embodiment of the present invention.

In FIG. 19, the method for molding of this embodiment is a method in which compression molding is conducted for the base 8 by means of the molding apparatus 1g, and has a heating step, a transfer step, a cooling step and a mold-releasing step.

(Heating Step)

Figure 19A:
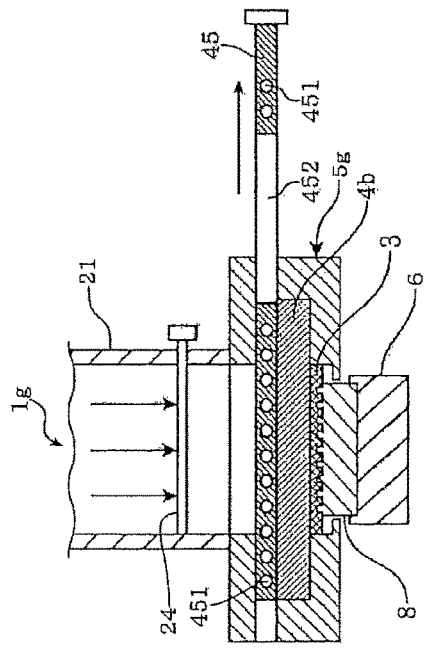
FIG. 19A is a schematic cross-sectional view for explaining the method for molding a thermoplastic resin product according to the sixth embodiment of the present invention.

The molding apparatus 1g, that is in the state shown in FIG. 18, i.e. the state in which the shutter 24 is closed, the left side of the forcedly cooled plate 45 is at a position that covers the cooling member 4b and the cooling member 4b enters the irradiation path, is shifted to the state shown in FIG. 19A in which the forcedly cooled plate 45 is moved to a position at which the opening part 452 corresponds to the light pipe 21, the cooling member 4b is retreated from the irradiation path, the shutter 24 is opened, and the stamper 3 in the state where it is remote from the cooling member 4b is irradiated with infrared rays emitted from the heating apparatus 2 (heating step).

In this way, by radiatingly heating the stamper 3 that is remote from the cooling member 4b, thermal conductance from the stamper 3 to the cooling member 4b is not conducted, whereby the stamper 3 can be heated effectively. Further, efficient heating can be conducted since infrared rays pass the opening 452, and as a result, the heating time can be shortened.

(Transfer Step)

Figure 19C:
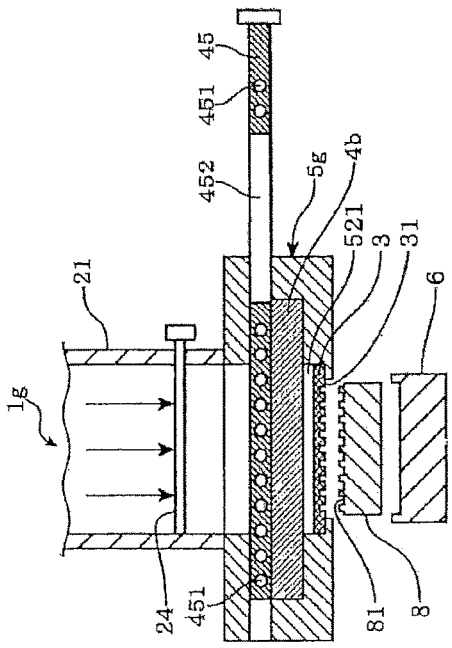
FIG. 19C is a schematic cross-sectional view for explaining the method for molding a thermoplastic resin product according to the sixth embodiment of the present invention.
Figure 19B:
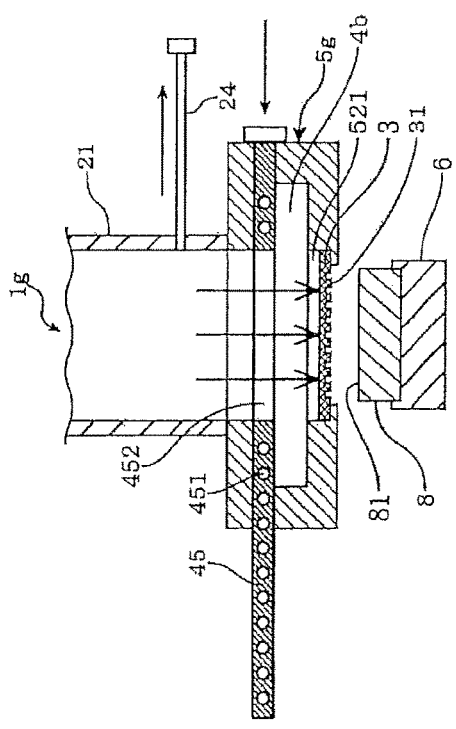
FIG. 19B is a schematic cross-sectional view for explaining the method for molding a thermoplastic resin product according to the sixth embodiment of the present invention.

Subsequently, in the molding apparatus 1g, as shown in FIG. 19B, the structure of the shape-forming surface 31 of the stamper 3 that has been radiatingly heated is transferred to the transfer surface 81 of the base 8 (transfer step). That is, in this transfer step, the shutter 24 is closed, the cooling member 4b enters the irradiation path of infrared rays, the second mold 6 is lifted up as clamping, the transfer surface 81 of the base 8 is brought into contact with the shape-forming surface 31 of the stamper 3. Then, the stamper 3 is moved upward as it is lifted up, and in the state where the stamper 3 is in contact with the cooling member 4b, the transfer surface 81 is pressed against the shape-forming surface 31, whereby the structure of the shape-forming surface 31 is transferred to the transfer surface 81 of the base 8.

In this embodiment, the thickness of the stamper 3 is several hundreds μm and the mechanical strength thereof is low. Therefore, transfer is conducted in the state where the cooling member 4b is in contact with the stamper 3, and hence, a disadvantage that the stamper 3 is deformed can be prevented, whereby transfer accuracy and the like can be improved (Cooling Step)

Subsequently, in the molding apparatus 1g, as shown in FIG. 19C, in the state where the shape-forming surface 31 is pressed against the transfer surface 81, the cooling member 4b that is in contact with the stamper 3 cools the stamper 3f, thereby to solidify or harden the base 8 (cooling step). That is, in this embodiment, the forcedly cooled plate 45 is moved so that a part on the left side of the forcedly cooled plate 45 covers the cooling member 4b, the cooling member 4b is cooled by the forcedly cooled plate 45, and the stamper 3 that is in contact with the cooling member 4b is efficiently cooled.

The cooling member 4b is efficiently cooled by the forcedly cooling plate 45 while keeping the temperature distribution of the cooling member 4b almost uniformly, whereby the cooling time can be further shortened.

Cooling after the transfer can be effectively conducted by the cooling member 4b of which an increase in temperature has been suppressed, occurrence of poor appearance of the molded product (for example, a protruded part, or the like) can be prevented, whereby quality can be improved.

(Mold-releasing Step)

Figure 19D:
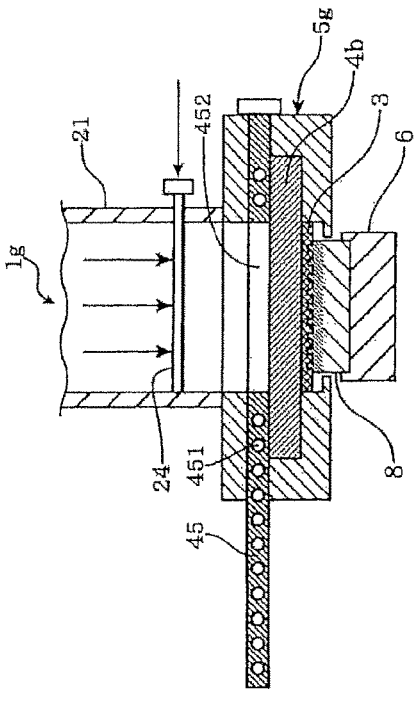
FIG. 19D is a schematic cross-sectional view for explaining the method for molding a thermoplastic resin product according to the sixth embodiment of the present invention.

Subsequently, in the molding apparatus 1g, as shown in FIG. 19D, by releasing the state where the shape-forming surface 31 is pressed against the transfer surface 81, the molded product is released from the mold (mold-releasing step). That is, in this mold-releasing step, the second mold 6 is lowered, and the stamper 3 is separated from the cooling member 4b and is moved downward. Then, the transfer surface 81 is separated from the shape-forming surface 31, and the second mold 6 is lowered to the original position. Thereafter, the base 8 is transported, whereby one cycle of molding is completed.

As explained hereinabove, according the molding apparatus 1g of this embodiment, not only almost similar effects as those attained by the molding apparatus 1b of the second embodiment are attained, but also, since cooling can be conducted efficiently while keeping the temperature distribution of the forcedly cooling plate 45 almost uniformly, the cooling time can be further shortened. Further, by the cooling member 4b of which an increase in temperature has been suppressed, occurrence of poor appearance of the molded product (for example, a protruded part, or the like) can be prevented, whereby quality can be improved.

In this embodiment, the cooling member 4b is forcedly cooled by the forcedly cooling plate 45. In the above-mentioned embodiment, forcedly cooling may be conducted by using the forcedly cooling plate 45 instead of the channel 512 for flowing a coolant.

Hereinabove, the method for molding a thermoplastic resin product and the molding apparatus therefor are explained with reference to the preferable embodiments and the like. The method for molding a thermoplastic resin product and the molding apparatus therefor are not restricted to those embodiments mentioned above and the like, and it is needless to say that various modifications are possible within the scope of the invention.

For example, the stamper-holding means 7, 7a or the like is not restricted to the above-mentioned configuration, and for example, though not shown, may have a configuration in which a tensile means including a spring and an electromagnetic solenoid is provided, or a configuration in which the stamper 3 is supported in the point contact and/or line contact state by a flat spring or the like embedded in the supporting part.

Also, the configuration in which the stamper and/or the cooling member are held in a movable manner is not restricted to the above-mentioned configuration, and may have various configurations.

The thermoplastic resin product obtained in the present invention is widely used in various applications. For example, it is used as a product for medical purpose, a product for analysis (microfluid device), an energy-related product (pipes, heat exchanger), an electrical product, an optical product, a package product, or the like. One example of a case in which transfer of the thermoplastic resin product to at least part of a package will be shown below.

The example will be explained with reference to FIG. 20. It is noted that the following content is described in Japan Patent Application No. 2012-108723. This package consists of a plastic bottle with a mouth 601, a cap (screw cap) 603 mounted on the mouth 601, a screwing stripe 605 for holding the cap 603, an annular lug 607 below the screwing stripe 605, and a supporting ring 609 for holding a bottle. The plastic bottle contains a liquid. In the plastic bottle of the package, the lower part of the mouth 601 merges into a curved shoulder and the shoulder merges into a body. The lower end of the body is closed by the bottom part.

On the other hand, the cap 603 has a top plate 610 and a cylindrical side wall 611 which falls from the circumferential edge of the top plate 610. The inner surface (in particular, circumferential edge parts) of the top plate 610 is provided with a liner 613 for sealing. On the inner surface of the cylindrical side wall 611, a screwing stripe 615 is formed, which engages in the screwing stripe 605 of the mouth 601 of the bottle.

In order to seal surely, the liner 613 has a relative long inner ring 613a and a relative short outer ring 613b. The top end part of the mouth 601 enters into the space between these two rings, whereby the inner side surface, the upper surface and the top edge of the outer side surface of the top end part come to be in close contact with the liner 613 to ensure sealing properties.

Figure 20:
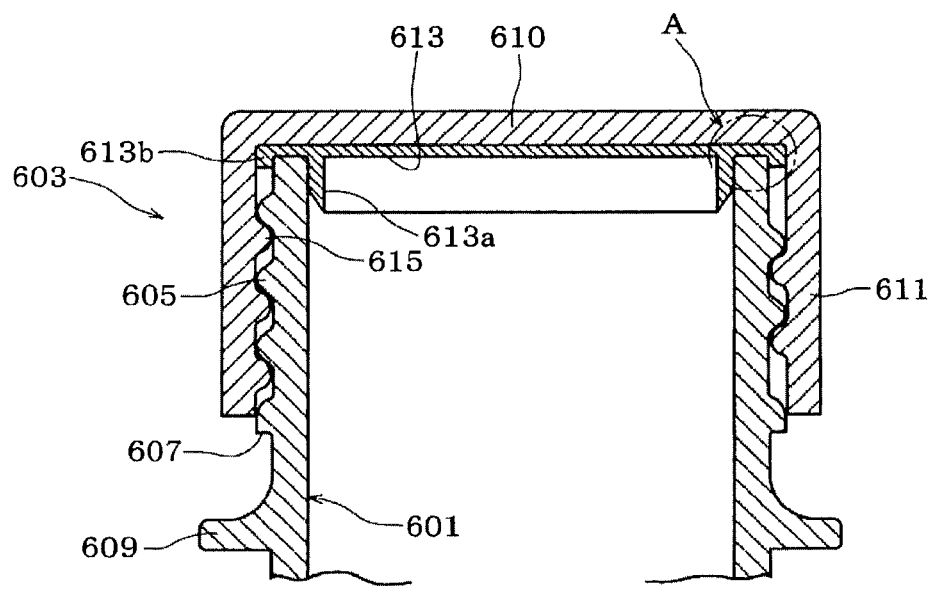
FIG. 20 is a cross-sectional side view showing essential parts of a package preferable in the present invention.

Although not shown in FIG. 20, generally, the lower end of the cylindrical side wall 611 of the cap 603 is provided with a tamper evident band (TE band) via a breakable weakening line. When this cap 603 is removed from the mouth 601 by opening part, the TE band is detached from the cap 603, thereby indicating the opening part track of the cap 603 to normal users and thus preventing illegal use such mischief.

Figure 21:
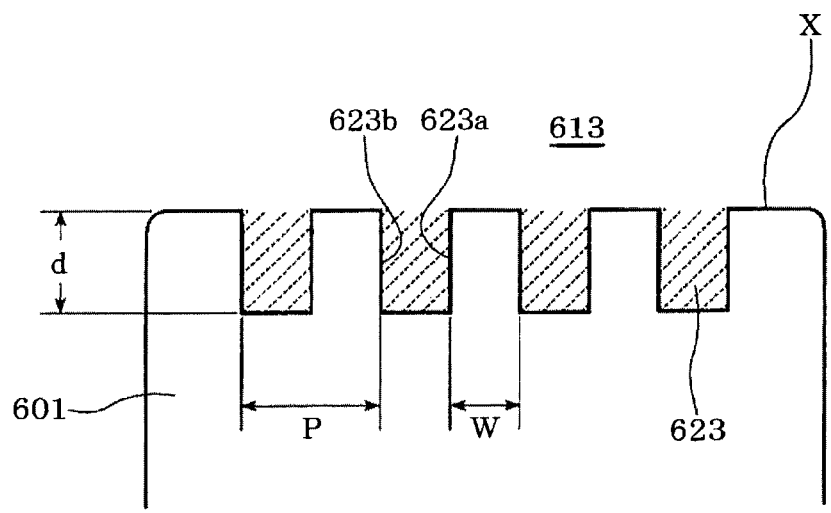
FIG. 21 is a partially enlarged cross-sectional view showing part A in FIG. 20 in an enlarged manner.
Figure 22:
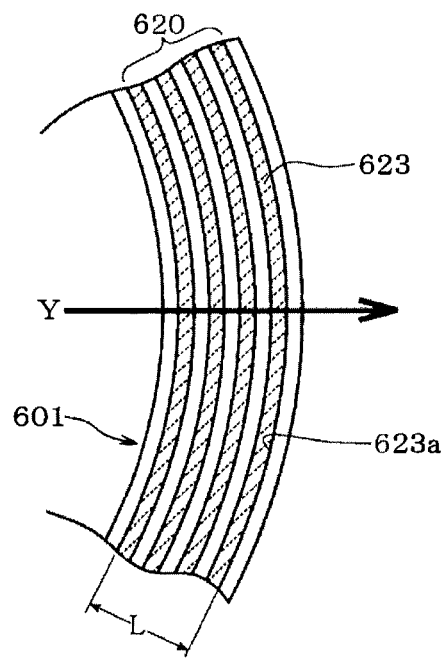
FIG. 22 is a plan view of a spout (the upper end surface of the bottle mouth part) of the package shown in FIG. 20.

With reference to FIG. 21, which is an enlarged cross section of A in FIG. 20, and FIG. 22, which is a plan view of FIG. 20, in the package, a top end surface X of the mouth 601 which serves as a spout for content liquid (hereinafter, often referred simply to as "spout") has a corrugated part 620. The corrugated part 620 is formed as arrays of intersecting channels 623 extending so as to intersect, in particular orthogonally, the flowing direction Y of content liquid poured out through the spout X. The corrugated part may be formed as arrays of channels extending in the flowing direction Y of the content, but not shown.

When the above-mentioned corrugated part 620 is formed on the spout X, in the closed state of the cap 603, the adherence between the liner 613 and the spout X may be lowered, thereby to deteriorate sealing properties. For this reason, in the case where the corrugated part 620 is formed by arrays of plural intersecting channels 623 mentioned above, as shown in FIG. 21, a side surface 623a of the outer surface side is a blocking surface for blocking flowing content liquid poured out and the blocking surfaces are multiply-formed depending on the number of the intersecting channels. That is, in this embodiment, sealing properties is ensured mainly by the adherence between the inner side surface of the spout X and the inner ring 613a, and auxiliary by the adherence between the short outer ring 613b and the outer side surface of the spout X. In addition, the above-mentioned blocking surface 623a serves to prevent leakage of the content liquid efficiently. Therefore, deterioration in sealing properties due to the formation of corrugated part 620 can be effectively prevented.

As for the pitch p of the intersecting channel 623 forming the corrugated part 620 and the width w of the convex part between the intersecting channels 623, for example, the ratio of the pitch p of the intersecting channel 623 to the width w of the convex part between the intersecting channels 623 (p/w) is preferably set to be larger than 1.0, and further w is preferably 500 μm or less. If w is too large, the content liquid insufficiently contacts with air, leading to insufficient water repellency. Further, it is preferred that the depth d of the intersecting channel 623 be 5 μm or more, and the length L of the corrugated part 620 be 50 μm or more.

Figure 23:
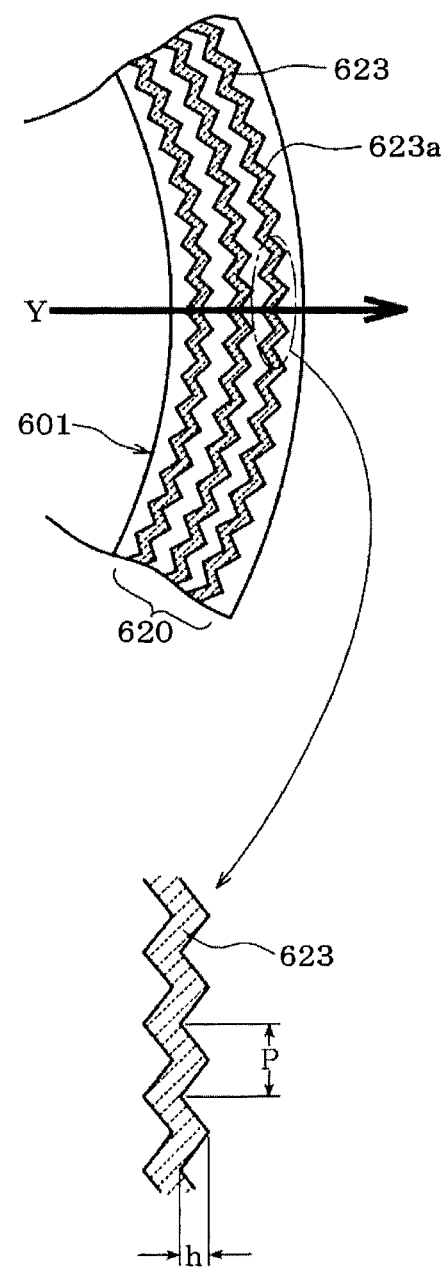
FIG. 23 is a partial plan view showing the optimum pattern of a corrugated part formed in the mouth part of the package shown in FIG. 20.
Figure 24:
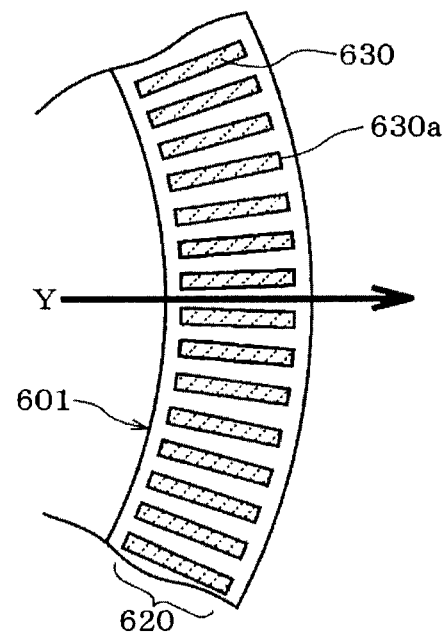
FIG. 24 is a partial plan view showing another pattern of a corrugated part formed in the mouth part of the package of the present invention.
Figure 25:
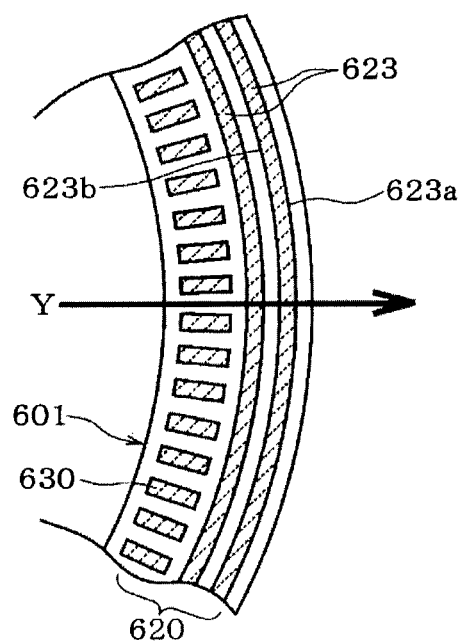
FIG. 25 is a partial plan view showing still another pattern of a corrugated part formed in the mouth part of the package of the present invention.

In the embodiment shown in FIG. 23, each of the intersecting channels 623 has a wave shape, and extends in a zig-zag manner and in a direction perpendicular to the flowing direction of the content liquid. It is preferred that the pitch p of the wave shape be 1000 μm or less and the height h of the wave shape be about 3 μm or more. If P is too large and h is too small, the effect of increasing of the side surface 623 becomes small, whereby it is difficult to prevent the lowering of sealing properties. It is possible to form the corrugated part 620 in other patterns, of which examples are shown in FIGS. 24 and 25. Blocking surfaces 630a serve to prevent leakage of the content liquid effectively.

In the embodiment according to FIG. 25, arrays of the intersecting channels 623 are preferably arranged on the outside of the arrays of parallel channels 630 in the bottle. Alternatively, the parallel channels 630 can be positioned between the arrays of the intersecting channels 623.

Figure 26:
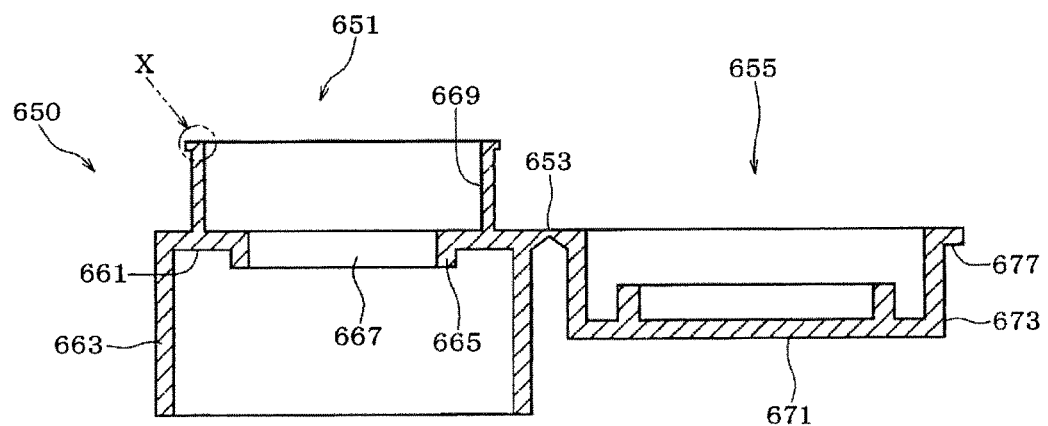
FIG. 26 is a cross-sectional side view showing another example of the package of the present invention.
Figure 27:
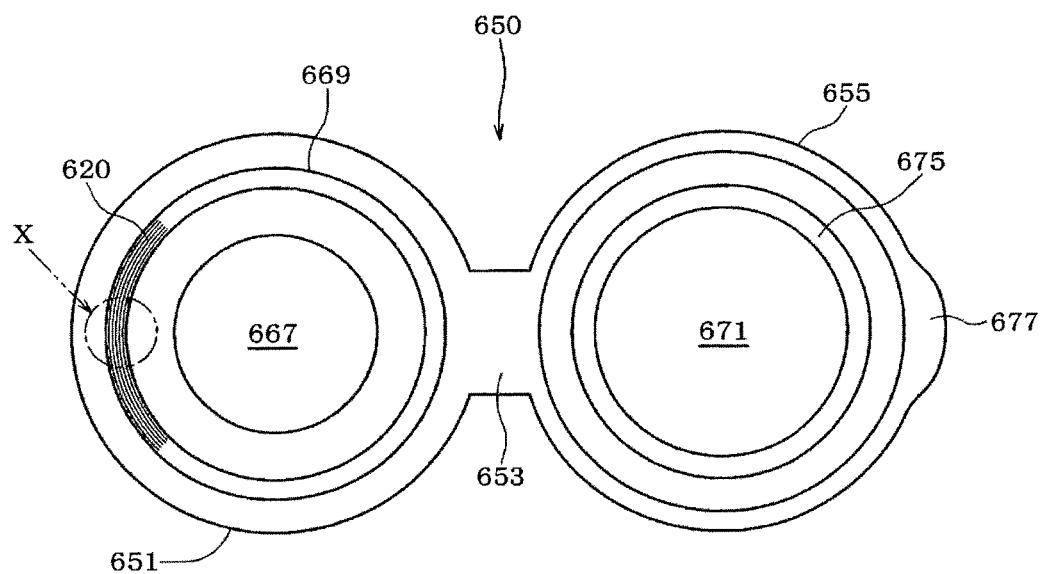
FIG. 27 is a plan view of the package shown in FIG. 26.

In FIGS. 26 and 27, the package is formed by mounting a cap (indicated by 650 in FIGs.) on the mouth 601 of a plastic bottle similar to that in the package shown in FIG. 20. A cap body 651 consists of a top panel 661 and a cylindrical side wall 663 falling down from the peripheral edge of the top panel 661. The inner surface of the top panel 661 is provided with an annular protrusion 665 extending downwardly with a distance from the cylindrical side wall 663. In the central part of the top panel 661, an opening 667 serving as a flow passage when the liquid is poured is formed. On the upper surface of the top panel 661, a pouring-out tube 669 is provided vertically such that it surrounds the opening 667.

On the other hand, a hinge lid 655 is composed of a top plate 671 and a skirt 673 extending from the circumferential edge of the top plate 671. The end part of the skirt 673 is coupled to a hinge band 653, and in turn the hinge band 653 is coupled to the upper end of the cylindrical side wall 663 of the cap body 601. By swirling at this hinge band 653 as a support point, the hinge lid 655 can be opened or closed.

On the inner surface (upper surface in FIG. 26) of the top plate 671 of this hinge lid 655, a seal ring 675 is formed. The end part opposed to the hinge band 653 of the top plate 671 is provided with a flange for opening part 677. That is, when the hinge lid 655 is closed, the outer surface of the seal ring 675 comes to contact with the inner surface of the pouring-out tube 669, whereby the seal property can be ensured even if the opening part 667 for pouring out content liquid is formed. Further, the flange for opening part 677 is provided in order to facilitate the swirling for open or close of the hinge lid 655.

In the above-mentioned packages shown in FIGS. 20 to 27, a plastic material for forming a plastic bottle with a mouth 601 is not particularly limited. The plastic bottle can be formed by using various thermoplastic resins such as olefin resins such as polyethylene and polypropylene, or polyester resins represented by polyethylene terephthalate (PET) as in the case of known plastic bottles. In the case where a spout X is present on the cap and thus a concave-concave part 620 is formed there, the bottle may be made of glass or a metal. The plastic material for forming a cap 603, 650 is also not particularly limited. As in the case of known plastic caps, the cap is formed by using various thermoplastic resins such as olefin resins, e.g. polyethylene and polypropylene. In contrast, in the case where a concave-concave part 620 is formed in the bottle due to the presence of the spout X, the cap may be a metallic screw cap. Further, a liner material 613 provided in the cap 603 or the like is made of known elastic materials, for example, a thermoplastic elastomer such as an ethylene-propylene co-polymer elastomer or a styrene-based elastomer.

In the above-mentioned packages, the corrugated part 620 can be formed most easily and at a lower cost by the following method. A stamper which is made of a rigid material (various metals or alloys, for example) and provided with an indented pattern corresponding to the corrugated part 620 is heated. The heated stamper is pressed against a part that serves as a spout of the pre-formed bottle or cap and the pattern is transferred thereto.

As the content liquid, various liquids ranging from a high-viscosity liquid to a low-viscosity liquid can be used with no particular limitation. For example, the package is particularly preferable as a bottle for non-carbonated beverage. Specifically, carbonated beverage is filled such that a head space with a certain level of volume is remained since carbonic acid is dissolved. On the other hand, non-carbonated beverage is almost fully-filled with no head space being remained. Thus, when pouring out immediately after opening a bottle, since liquid is poured out with the bottle being slightly inclined (the bottle is almost standing), liquid leakage occurs very easily. Even under such a circumstance, the package of the present invention can prevent liquid leakage effectively even at the initial pouring-out of non-carbonated beverage.

In addition, as a bottle, a plastic bottle is most preferable. In the case of a plastic bottle, the spout of a bottle is formed in a white color by thermal crystallization for imparting heat resistance. At the same time, when the content liquid is a colored liquid such as coffee, soy sauce, various juices or the like, if liquid leakage occurs, the spout significantly gets dirty by the content liquid. Therefore, in such a case, the package of the present invention is extremely useful since it can prevent dripping effectively.

The invention claimed is:

1. A method for molding a thermoplastic resin product comprising:

heating a stamper with infrared rays emitted from a heating apparatus through an irradiation path;

transferring a structure of a shape-forming surface of the heated stamper to a transfer surface of a thermoplastic resin;

cooling the stamper by bringing the stamper into contact with a cooling member, wherein the thermoplastic resin is cooled through the stamper to solidify or harden the thermoplastic resin; and releasing the transfer surface from the shape-forming surface to allow a molded product to be released from the stamper, wherein in the heating, the stamper is irradiated with the infrared rays in a state where the cooling member is retreated from the irradiation path, and at least in the final stage of the transferring, the cooling member is placed in the irradiation pathway, the stamper is brought into contact with the cooling member, and the cooling starts.

2. The method for molding the thermoplastic resin product according to claim 1, wherein, the cooling starts after the transferring is initiated.

3. The method for molding the thermoplastic resin product according to claim 1, wherein the transferring is conducted by using only heat stored by the stamper in the heating.

4. The method for molding the thermoplastic resin product according to claim 1, wherein the stamper is radiatingly heated in the transferring.

5. The method for molding, the thermoplastic resin product according to claim 1, wherein, in the transferring, the stamper is energized in the direction of the thermoplastic resin and/or the stamper is pulled in an outward direction.

6. The method for molding the thermoplastic resin product according to claim 1, wherein, in the heating, the stamper is held in a state of point contact and/or line contact.

7. The method for molding the thermoplastic resin product according to claim 1, wherein the transferring is conducted by the stamper that is held in a state where it is remote from the cooling member.

8. The method for molding the thermoplastic resin product according to claim 7, wherein, in the transferring, the stamper is held in a state where it is remote from the cooling member by applying a pressure to a gap between the cooling member and the stamper.

* * * * *